US011747903B2

(12) United States Patent
Keller et al.

(10) Patent No.: US 11,747,903 B2
(45) Date of Patent: Sep. 5, 2023

(54) HEADWARE FOR COMPUTER CONTROL

(71) Applicant: Neurosity, Inc., Brooklyn, NY (US)

(72) Inventors: Andrew Jay Keller, Norwalk, CT (US); Alexander Aziz Castillo Alvarez, Brooklyn, NY (US); Samuel Stephen Holland, Brooklyn, NY (US)

(73) Assignee: NEUROSITY, INC., Brooklyn, NY (US)

( * ) Notice: Subject to any disclaimer, the term of this patent is extended or adjusted under 35 U.S.C. 154(b) by 23 days.

(21) Appl. No.: 17/364,180

(22) Filed: Jun. 30, 2021

(65) Prior Publication Data

US 2022/0004257 A1 Jan. 6, 2022

Related U.S. Application Data

(60) Provisional application No. 63/046,891, filed on Jul. 1, 2020.

(51) Int. Cl.
*G06F 3/01* (2006.01)
*G06F 1/16* (2006.01)
*G08B 6/00* (2006.01)

(52) U.S. Cl.
CPC .............. *G06F 3/015* (2013.01); *G06F 1/163* (2013.01); *G06F 3/016* (2013.01); *G08B 6/00* (2013.01)

(58) Field of Classification Search
CPC .......... G06F 3/015; G06F 1/163; G06F 3/016; G06F 1/1656; G06F 1/1684; G06F 1/1698; G08B 6/00

(Continued)

(56) References Cited

U.S. PATENT DOCUMENTS 6,036,019 A * 3/2000 Silverman .......... B65D 81/3834
206/478
6,291,824 B1 9/2001 Battarbee et al.
(Continued)

FOREIGN PATENT DOCUMENTS

CA 2583100 A1 * 9/2007 ............. G02C 11/00
WO 2014094036 A1 6/2014

OTHER PUBLICATIONS

Waytowich et al., "Spectral Transfer Learning Using Information Geometry for a User-Independent Brain-Computer Interface," Frontiers in Neuroscience, Sep. 22, 2016, pp. 1-15, vol. 10, Article 430.
(Continued)

*Primary Examiner* — Fekadeselassie Girma
*Assistant Examiner* — Mancil Littlejohn, Jr.
(74) *Attorney, Agent, or Firm* — Carter, DeLuca & Farrell LLP; George Likourezos

(57) ABSTRACT

A headware for computer control includes a body portion. A first arm is pivotally coupled to the body portion and a second arm is pivotably coupled to the body portion. The first arm and the second arm define a central region therebetween. A pivoting mechanism is coupled to the first arm or the second arm and the body portion. The pivoting mechanism pivots the first arm or the second arm towards or away from the central region. The pivoting mechanism includes a pivot pin securing the first arm or the second arm to the body portion. A biasing member biases the first arm or the second arm toward the central region when the first arm or the second arm is pivoted away from the central region.

12 Claims, 27 Drawing Sheets

(58) Field of Classification Search
USPC .................................................... 340/407.1
See application file for complete search history.

(56) References Cited

U.S. PATENT DOCUMENTS

| | | | |
|---|---|---|---|
| 6,944,602 B2 | 9/2005 | Cristianini | |
| 7,551,952 B2* | 6/2009 | Gevins | A61B 5/291 600/383 |
| 8,548,555 B2 | 10/2013 | Jin et al. | |
| 8,989,836 B2* | 3/2015 | Machon | A61B 5/6844 600/383 |
| 9,470,907 B2* | 10/2016 | Esmaeili | G02C 5/20 |
| 10,966,007 B1* | 3/2021 | Fenner | H04R 1/1016 |
| 2005/0071301 A1 | 3/2005 | Kuroiwa | |
| 2007/0133878 A1 | 6/2007 | Porikli et al. | |
| 2007/0191727 A1* | 8/2007 | Fadem | A61B 5/378 600/544 |
| 2012/0071780 A1 | 3/2012 | Barachant et al. | |
| 2016/0100758 A1 | 4/2016 | Jeong | |
| 2016/0239084 A1 | 8/2016 | Connor | |
| 2018/0348863 A1* | 12/2018 | Aimone | A61B 5/369 |

OTHER PUBLICATIONS

Parisi et al., "Ranking and Combining Multiple Predictors Without Labeled Data," PNAS, Jan. 28, 2014, pp. 1253-1258, vol. 111, No. 4.

* cited by examiner

106

HEADWARE FOR COMPUTER CONTROL

CROSS-REFERENCE TO RELATED APPLICATION

This U.S. Non-Provisional patent application claims priority to U.S. Provisional Patent Application No. 63/046,891, filed on Jul. 1, 2020, the entire contents of which are incorporated by reference herein.

TECHNICAL FIELD

The present application relates to computer control, and in particular, to headware for computer control.

SUMMARY

This disclosure relates to headware for computer control. In accordance with aspects of the present disclosure, the headware includes an inner layer including a first surface and a second surface, an outer layer disposed on the first surface of the inner layer, and at least one sensor disposed on the second surface of the inner layer, the at least one sensor to measure electrical signals from a brain and communicate the electrical signals to a computing device. The headware sits at the top of a head and apply pressure to at least one side of the head.

In an aspect of the present disclosure, the inner layer is comprised of nylon. In another aspect of the present disclosure, the outer layer is comprised of aluminum. In an aspect of the present disclosure, the at least one sensor includes at least one electrode. In yet another aspect of the present disclosure, the at least one electrode is arranged in positioning targeting at least one of the following positions of the EEG 10-20 grid system: PO3, PO4, CP1, CP2, T7, T8, C3, C4, FT7, or FC8. In a further aspect of the present disclosure, the at least one sensor is replaceable.

In an aspect of the present disclosure, the communicating is wireless including at least one of WIFI®, Bluetooth®, or NFC. In a further aspect of the present disclosure, the headset is configured to distribute and apply pressure evenly to the at least one sensor.

In accordance with aspects of the present disclosure, a headware for computer control is presented. The headware includes an inner layer including a first surface and a second surface, an outer layer disposed on the first surface of the inner layer, and at least one receiving point for placement of at least one sensor therein, the receiving point disposed on the second surface of the inner layer, the at least one sensor configured to measure electrical signals from a brain and communicate the electrical signals to a computing device. The headware sits at the top of a head and apply pressure to at least one side of the head.

In an aspect of the present disclosure, the inner layer is comprised of nylon. In another aspect of the present disclosure, the outer layer is comprised of aluminum. In an aspect of the present disclosure, the at least one sensor includes at least one electrode. In yet another aspect of the present disclosure, the at least one electrode is arranged in positioning targeting at least one of the following positions of the EEG 10-20 grid system: PO3, PO4, CP1, CP2, T7, T8, C3, C4, FT7, or FC8. In a further aspect of the present disclosure, the at least one sensor is replaceable. In an aspect of the present disclosure, the communicating is wireless including at least one of WIFI®, Bluetooth®, or NFC. In a further aspect of the present disclosure, the headset is configured to distribute and apply pressure evenly to the at least one sensor.

In an aspect of the present disclosure, a headware for computer control includes an inner layer including a first surface and a second surface. An outer layer is disposed on the first surface of the inner layer. The headware includes at least one receiving point for placement of at least one sensor therein. The receiving point is positioned between the inner layer and the outer layer. At least one sensor is configured to measure electrical signals from a brain and communicate the electrical signals to a computing device. The headware sits at the top of a head and applies pressure to at least one side of the head. The receiving point include a first orifice adjacent to the second surface of the inner layer. The first orifice extends in a first direction. A second orifice is in communication with the first orifice and extends along a second direction crossing the first direction. The at least one sensor includes a protrusion configured to be engaged with (e.g., rotatbly engaged with) the second orifice.

In an aspect of the present disclosure, the receiving point includes a deformable circuit board positioned between the inner layer and the outer layer. The protrusion of the at least one sensor directly contacts the deformable circuit board when the protrusion is engaged (e.g., rotatably engaged) with the second orifice.

In an aspect of the present disclosure, the receiving point includes a deformable block between the deformable circuit board and the outer layer.

In an aspect of the present disclosure, a headware for computer control includes a body portion. A first arm is pivotally coupled to the body portion and a second arm is pivotably coupled to the body portion. The first arm and the second arm define a central region therebetween. A pivoting mechanism is coupled to the first arm or the second arm and the body portion. The pivoting mechanism pivots the first arm or the second arm towards or away from the central region between the first arm and the second arm. The pivoting mechanism includes a pivot pin securing the first arm or the second arm to the body portion. The first arm or the second arm pivot about the pivot pin when the first arm or the second arm pivot with respect to the body portion. A biasing member is secured in the body portion. The biasing member biases the first arm or the second arm toward the central region when the first arm or the second arm is pivoted away from the central region.

In an aspect of the present disclosure, the biasing member is a torsion spring.

In an aspect of the present disclosure, the torsion spring is arranged about the pivot pin.

In an aspect of the present disclosure, the torsion spring includes an arm extending from the body toward the first arm or the second arm. The arm of the torsion spring biases the first arm or the second arm towards the central region when the first arm or the second arm is pivoted away from the central region.

In an aspect of the present disclosure, a recess is formed in the first arm or the second arm, the recess configured to receive the arm of the torsion spring.

In an aspect of the present disclosure, a biasing member cover is removably coupled to the body portion and covers the biasing member in the body portion.

In an aspect of the present disclosure, the biasing member cover includes a pivot pin cap.

In an aspect of the present disclosure, the biasing member cover includes an orifice aligned with an orifice formed in an interior of the body portion. The orifice receives a screw to secure the biasing member cover to the body portion.

In an aspect of the present disclosure, a post extends from an inner surface of the body. The post secures the biasing member to the body portion.

In an aspect of the present disclosure, a headware for computer control includes an inner shell including an inner surface and an outer surface. An outer shell is coupled to the inner shell. The outer shell includes an inner surface. The inner shell and the outer shell define an inner space between the inner shell and the outer shell. At least one receiving point is formed in the inner shell. At least one sensor is movably coupled to the at least one receiving point. The sensor includes a plurality of electrode tips. The sensor measures electrical signals from a brain and communicates the electrical signals to a computing device. The headware is secured to a user's head and applies pressure to at least one side of the head such that the electrode tips remain in direct contact with the user's head. The receiving point includes an orifice formed in the inner layer. Electrode tips of the sensor extend through the orifice. An electrode holder receptor extends from the inner surface of the inner layer into the inner space between the inner layer and the outer layer. An electrode holder is movably positioned in the electrode holder receptor. The sensor is rotatably secured to the electrode holder. A flexible circuit includes at least one electrical contact. The sensor is electro-mechanically connected with the electrical contact. A deformable block is positioned on the inner surface of the outer shell. The deformable block allows the electrode holder and the sensor to move with respect to the inner shell to maintain contact between the electrode tips of the sensor and the user's head. The deformable block allows the sensor to remain continuously electro-mechanically connected with the electrical contact.

In an aspect of the present disclosure, a stiffening pad is disposed between the electrical contact and the deformable block. The stiffening pad prevents warping or deformation of the flexible circuit.

In an aspect of the present disclosure, a shelf is formed on the inner surface of the outer shell. The shelf supports a bottom surface of the deformable block.

In an aspect of the present disclosure, the electrode holder includes projections extending circumferentially outwardly from the electrode holder. The electrode holder receiver defines notches into which the projections are respectively disposed. The notches allow the electrode holder and the at least one sensor secured thereto to tilt with respect to the inner shell.

In an aspect of the present disclosure, the electrode holder includes three projections and the electrode holder receptor includes three notches. The three notches are equally circumferentially spaced apart from each other about the electrode holder receptor.

In an aspect of the present disclosure, a haptic motor system is positioned in the inner space between the inner shell and the outer shell. The haptic motor system includes at least one haptic motor. The haptic motor system delivers tactile signals to the user's head.

In an aspect of the present disclosure, the haptic motor system includes at least two haptic motors positioned at opposite sides of the body portion of the headware.

In an aspect of the present disclosure, a central processing unit is in electrical communication with the at least two haptic motors. The at least two haptic motors can be individually controlled by the central processing unit. At least one haptic motor connector is connected with at least one haptic motor.

In an aspect of the present disclosure, a pivoting mechanism includes a housing assembly defining an orifice. The housing assembly is configured to be secured to the body portion. A pivot pin extends through the orifice of the housing assembly. The pivot pin is configured to secure the first arm or the second arm to the body portion. The first arm or the second arm pivot about the pivot pin when the first arm or the second arm pivot with respect to the body portion. A torsion spring is arranged about the pivot pin. The torsion spring is configured to bias the first arm or the second arm toward the central region when the first arm or the second arm is pivoted away from the central region.

In an aspect of the present disclosure, the housing assembly includes an extension arm configured to be connected with the first arm or the second arm. The extension arm is rotatably secured to the pivot pin.

In an aspect of the present disclosure, the extension arm includes a first extension member rotatably secured to the pivot pin and a second extension member spaced apart from the first extension member. The second extension member is rotatably secured to the pivot pin.

In an aspect of the present disclosure, the torsion spring includes an arm extending therefrom. The arm of the torsion spring is configured to contact the extension arm of the housing assembly. The arm of the torsion spring is configured to bias the extension arm toward the central region.

In an aspect of the present disclosure, the extension arm includes a recess. The recess is configured to receive the arm of the torsion spring.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1A:
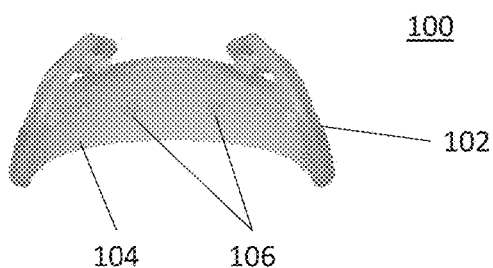
FIG. 1A is an exemplary rear view of a headware for computer control in accordance with the present disclosure.
Figure 1B:
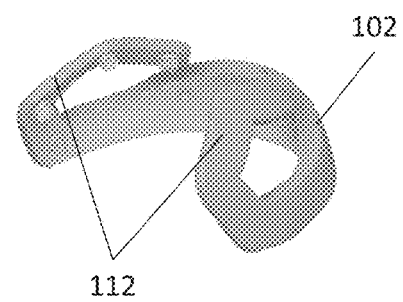
FIG. 1B is an exemplary side view of a headware for computer control in accordance with the present disclosure.
Figure 1C:
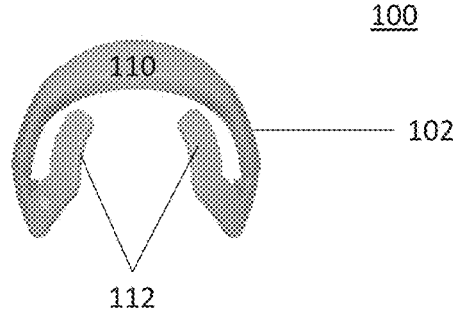
FIG. 1C is an exemplary front view of a headware for computer control in accordance with the present disclosure.
Figure 1D:
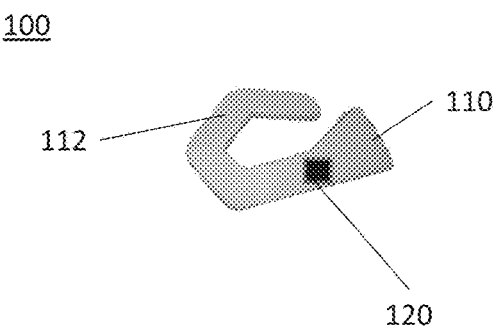
FIG. 1D is an exemplary side view of a headware for computer control in accordance with the present disclosure.

This disclosure relates to computer control. In one aspect, the present disclosure provides a headset for computer control.

As used herein, the terms parallel and perpendicular are understood to include relative configurations that are substantially parallel and substantially perpendicular up to about + or −10 degrees from true parallel and true perpendicular.

"About" or "approximately" as used herein may be inclusive of the stated value and means within an acceptable range of variation for the particular value as determined by one of ordinary skill in the art, considering the measurement in question and the error associated with measurement of the particular quantity (e.g., the limitations of the measurement system). For example, "about" may mean within one or more standard variations, or within ±30%, 20%, 10%, 5% of the stated value.

Descriptions of technical features or aspects of an exemplary embodiment of the present disclosure should typically be considered as available and applicable to other similar features or aspects in another exemplary embodiment of the present disclosure. Accordingly, technical features described herein according to one exemplary embodiment of the present disclosure may be applicable to other exemplary embodiments of the present disclosure, and thus duplicative descriptions may be omitted herein.

Exemplary embodiments of the present disclosure will be described more fully below (e.g., with reference to the accompanying drawings). Like reference numerals may refer to like elements throughout the specification and drawings.

The terms "electrode" and "sensor" may be user interchangeably herein.

FIGS. 1A-1D are exemplary embodiments of a headware for compute control in accordance with aspects of the present disclosure. The headware 100 includes a curved band 110, and one or more arms 112 coupled to the curved band 110. The arms 112 and curved band 110 include an inner layer 104 and an outer layer 102. In various embodiments, the inner layer 104 includes a first and a second surface. Disposed on the first surface of the inner layer 104 is an outer layer 102.

In various embodiments, the inner layer 104 and outer layer 102 may be made of resilient material. For example, the inner layer 104 may be formed from a resilient material such as, but not limited to, nylon, while the outer layer 102 may be formed from a resilient material such as, but not limited to, aluminum. It is contemplated that other resilient materials may be used for the inner layer 104 and outer layer 102. In various embodiments, the arms 112 may be designed to apply an even amount of clamping force or pressure throughout all contact points to a head.

In various embodiments, the inner layer 104 of the curved band 110, may be configured to have receiving points for replaceable sensors 106. In various embodiments, the sensors may be disposed on the inner layer 104 along the curved band and/or the arms. In embodiments, the sensors 106 may be electrodes. In various embodiments, the headset may include a computing device 120 configured for communicating sensor 106 measurements to another computing device. The computing device 120 may include memory, a processor and a communication circuit. It is contemplated that the communication may be wired or wireless. In various embodiments, the wireless communicating may include, for example, WIFI®, Bluetooth®, or near field communications (NFC).

Figure 2A:
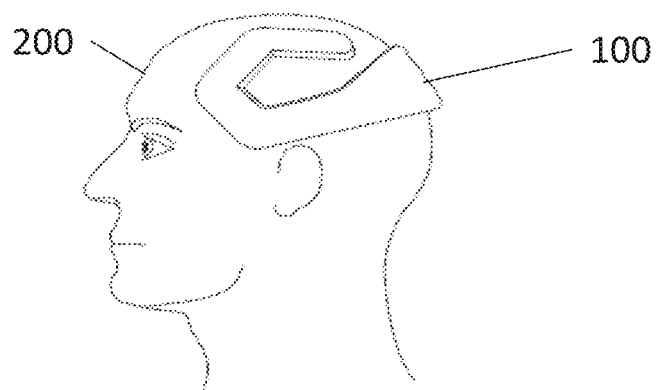
FIG. 2A is an exemplary profile view of the headware of FIG. 1 worn on a human head.
Figure 2B:
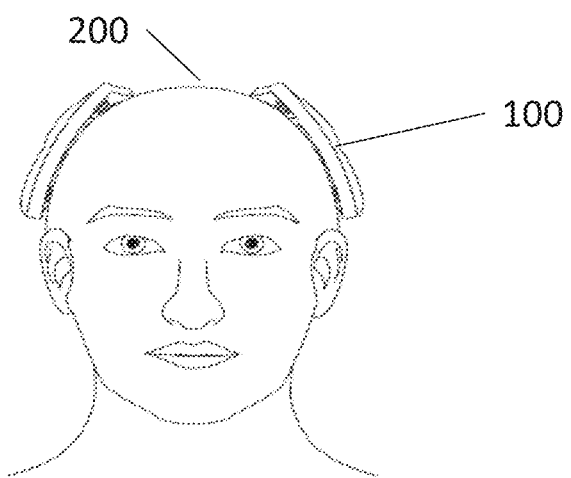
FIG. 2B is an exemplary front view of the headware of FIG. 1 worn on a human head.
Figure 3:
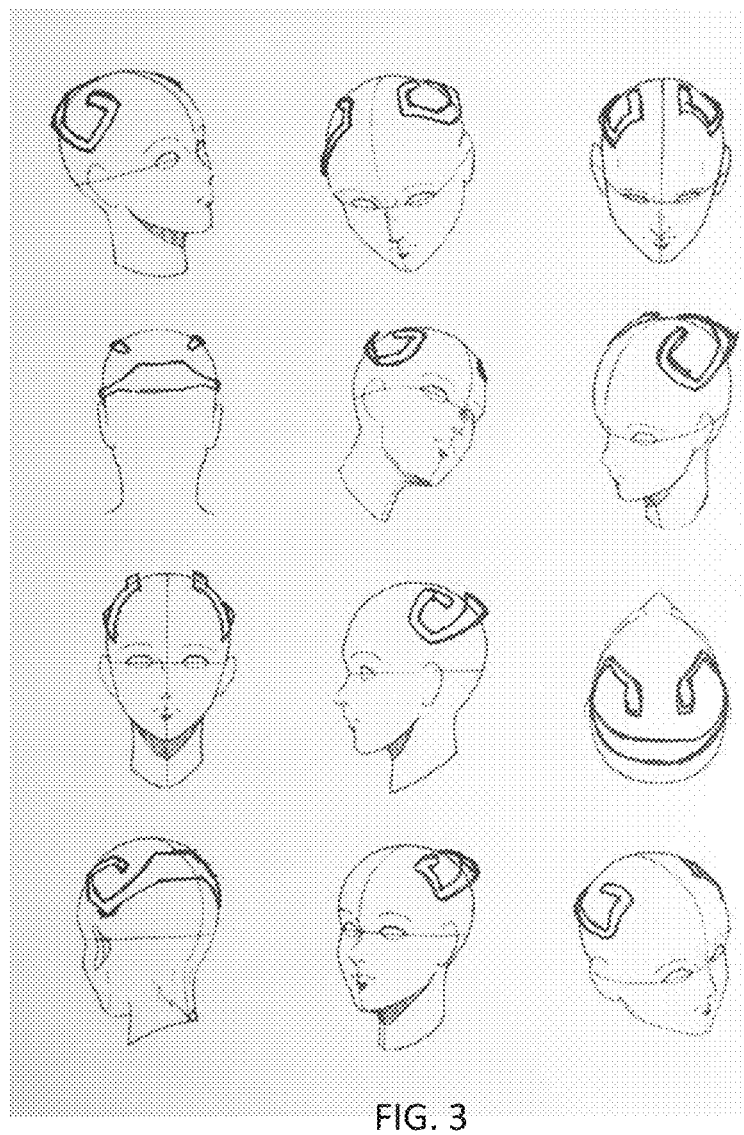
FIG. 3 are various exemplary views of the headware of FIG. 1 worn on a human head.

Referring now to FIG. 2A, FIG. 2B, and FIG. 3, there are shown various views of the headware 100 of FIG. 1 on a head 200. In various embodiments, the headware 100 may sit at the top of the head 200 and may apply pressure on both sides of the head 200. In various embodiments, the headware 100 may apply contact on the parts of the head 200 with the least amount of muscle movement. Improved signal quality from the sensors 106 of FIG. 1 may be provided by this maintaining of position of the headware 100 upon the head 200.

Figures 4A, 4B:
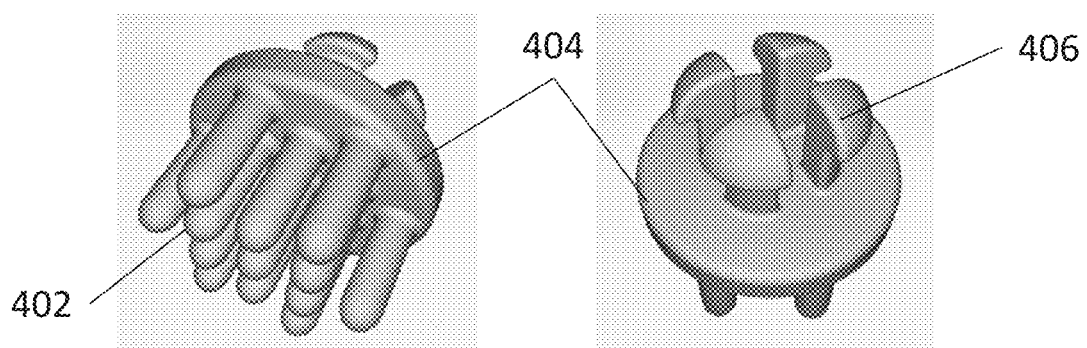
FIG. 4A is an exemplary bottom view of a sensor, in accordance with the present disclosure.
FIG. 4B is an exemplary top view of an electrode, in accordance with the present disclosure.

With reference to FIG. 4A and FIG. 4B, there is shown a sensor 106, in accordance with the present disclosure. In various embodiments, the sensors 106 may include electrodes. In various embodiments, the sensors may snap into a receiving point. The receiving point(s) may be holes located on the inner layer 104 of the headware 100. In various embodiments, the receiving point(s) may be located on the curved band 110 and or on the arms 112.

The sensors 106 record electrical activity and brain waves based on their position on the scalp. The electrical activity and brain waves measured by the brain waves is communicated electrically to a computing device 120. The computing device 120 may then communicate the electrical activity and brain waves to another computing device, or store it in an onboard memory. In various embodiments, the data form the recorded electrical activity and brain waves may be communicated to a server. It is contemplated that the server may be local, on a remote network, or located on the cloud.

A brain is constantly active, generating electrical activity which is very subtle (significantly less than a 9V battery) but detectable with the sensors 106. Sensors 106 are able to pick up these tiny signals from the scalp surface. EEG signals may relate to cognitive, affective or attentional processing. In various embodiments, the headware 100 may take for example, hundreds to thousands of snapshots of electrical activity across multiple sensors within a single second. In various embodiments, the headware 100 may include an amplifier to amplify the signals that the sensors measure. In various embodiments, conductive gel, paste or cream, typically based on saline, may be used where the sensors contact the scalp. In various embodiments, the sensors may be dry mounted. In various embodiments, the sensors may be covered in a bio-compatible material, not limited to graphene, or Ag/AgCl.

In various embodiments, the measured signals may be used to control a computer or other computing device. For example, the signals measured by the headset 100 may be used to operate a pointer such as a mouse, or control a player in a video game.

Figure 5:
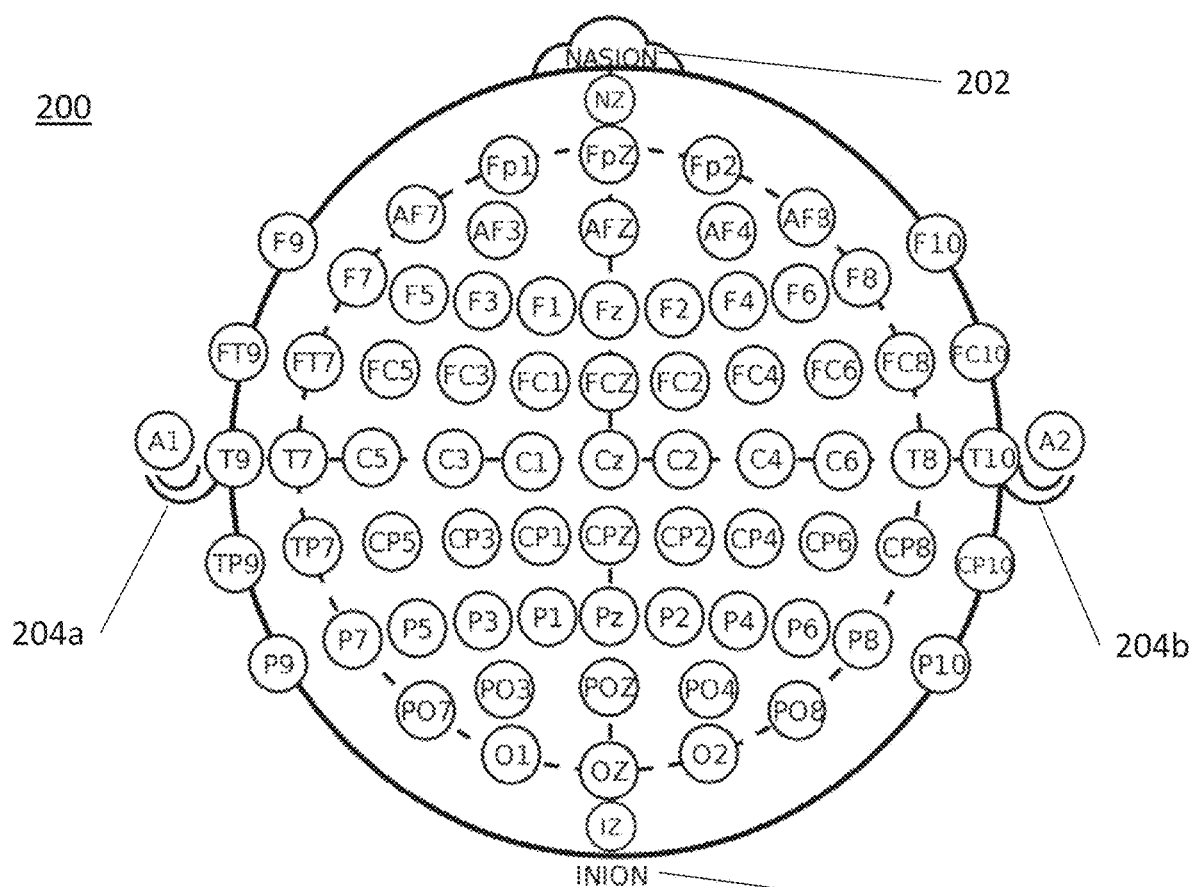
FIG. 5 is a diagram of the International EEG 10-20 grid system.

Referring now to FIG. 5, there is shown an exemplary view of an Electroencephalography (EEG) 10-20 grid system in accordance with aspects of the present disclosure. In the 10-20 system, the electrode names begin with one or two letters indicating the general brain region or lobes where the electrode is placed. Fp=frontopolar; F=frontal; C=central; O=occipital; and T=temporal. Each electrode name ends with a number or letter indicating the distance to the midline. Odd numbers are used in the left hemisphere, even numbers in the right hemisphere. Larger numbers indicate greater distances from the midline, while electrodes placed at the midline are labeled with a "z" for zero. For example, Cz is placed over midline central brain regions. The nasion 202 is the depression between the eyes at the top of the nose. The inion 206 is the bump at the back of the scalp. The left preauricular point 204a and right preauricular point 204b are depressions just anterior to the ears that you can feel with your finger when one opens or closes their mouth.

The headware 100 may record electrical activity and brain waves using sensors 106, such as electrodes, placed on the scalp. Measuring electrical activity from the brain may reflect how the many different neurons in the brain network communicate with each other via electrical impulses. With reference to FIG. 5, the sensors 106 may be placed at positions PO3, PO4, CP1, CP2, T7, T8, C3, FT7, and/or FC8. It is contemplated that sensors may be located at other positions.

Figure 6:
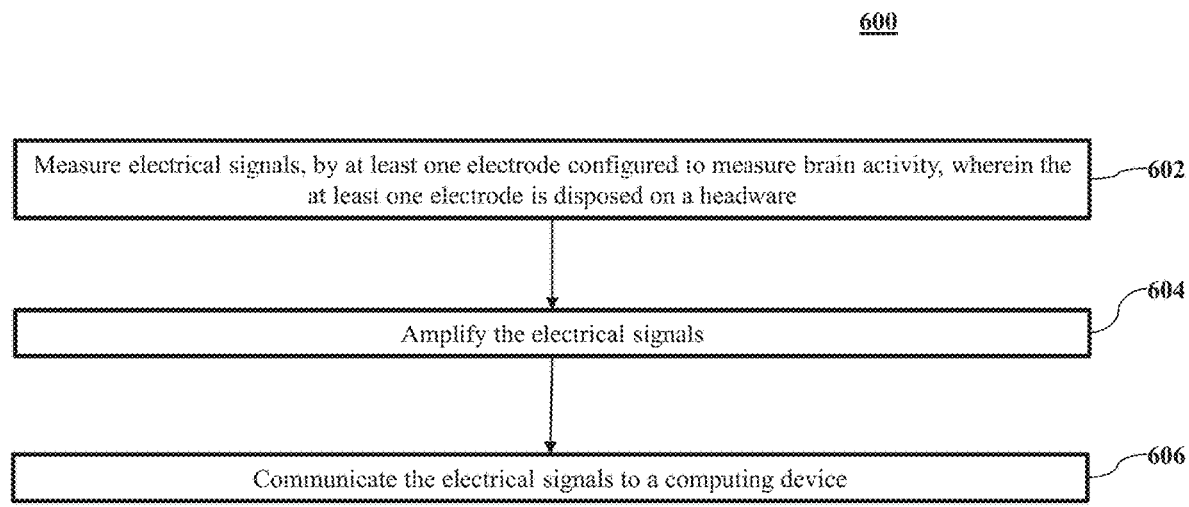
FIG. 6 is an exemplary flowchart of a method of the headware of FIG. 1 controlling a computer.
Figure 7:
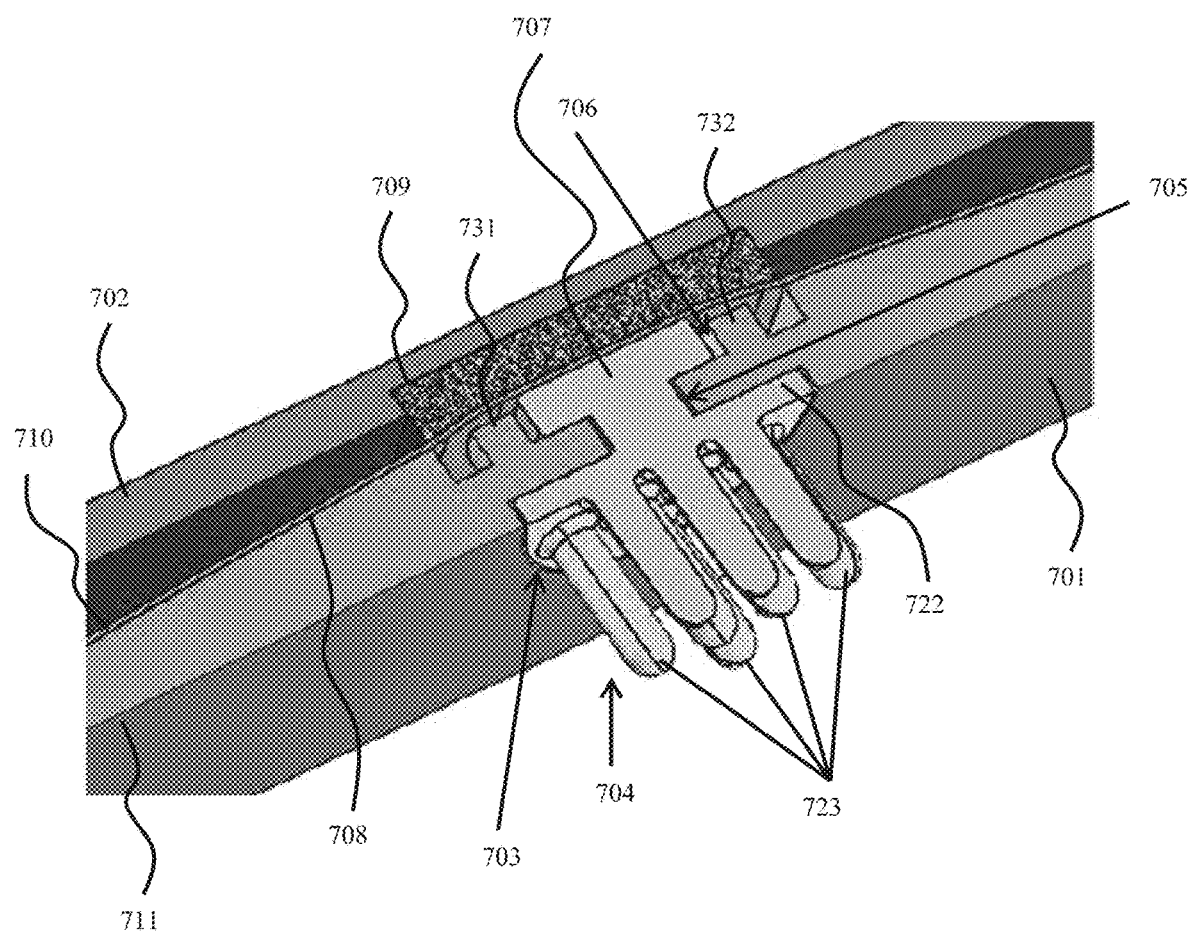
FIG. 7 is an exemplary bottom perspective view of an electrode, in accordance with the present disclosure.
Figure 8A:
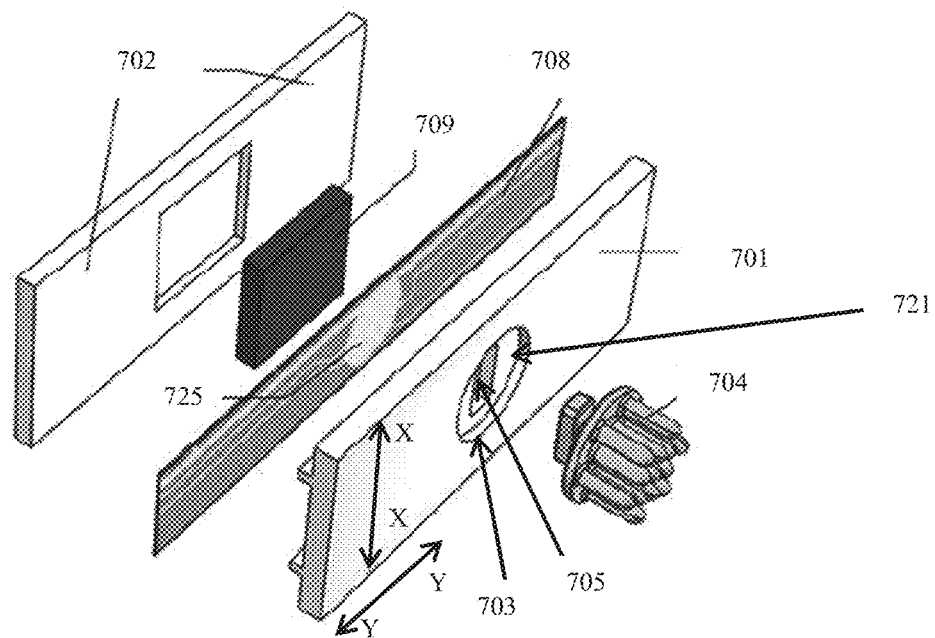
FIG. 8A is an exploded bottom view of the electrode of FIG. 7.
Figure 8B:
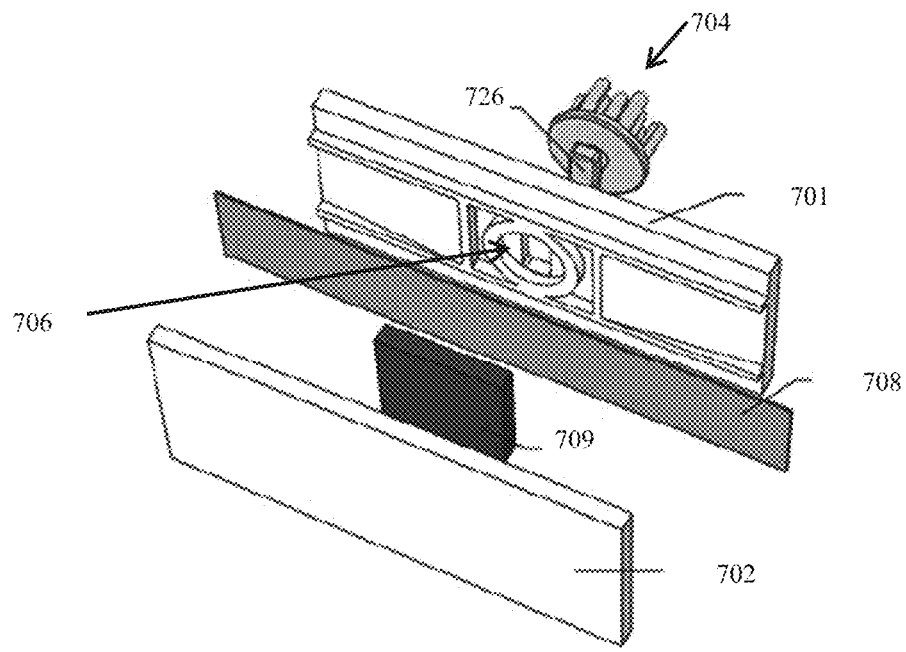
FIG. 8B is an exploded top view of the electrode of FIG. 7.
Figure 9A:
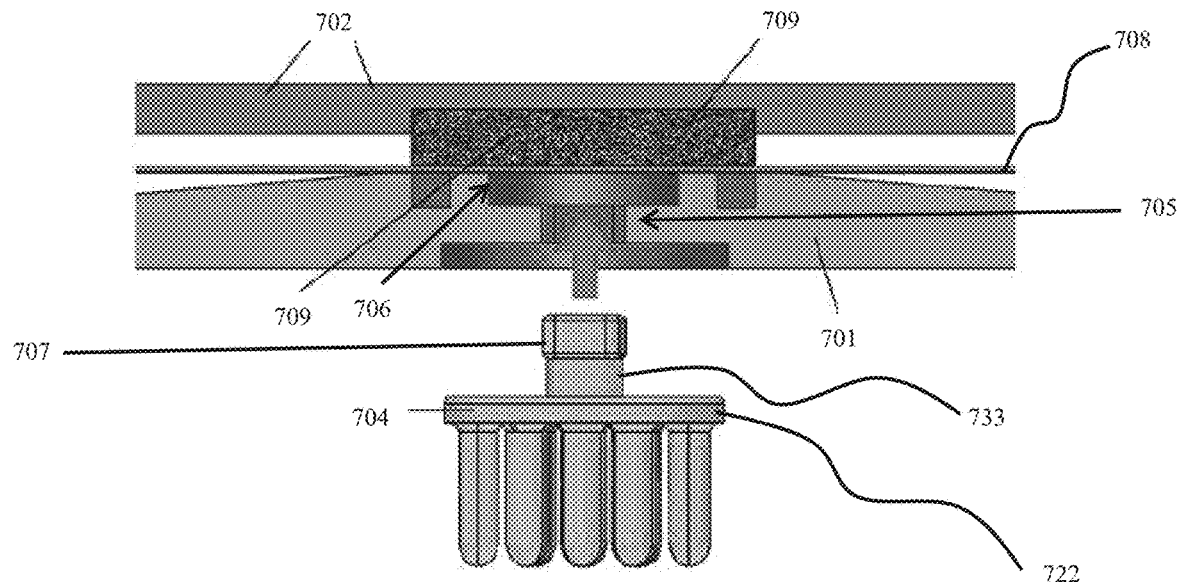
FIG. 9A is a side view of the electrode of FIG. 7 spaced apart from a receiving point.
Figure 9B:
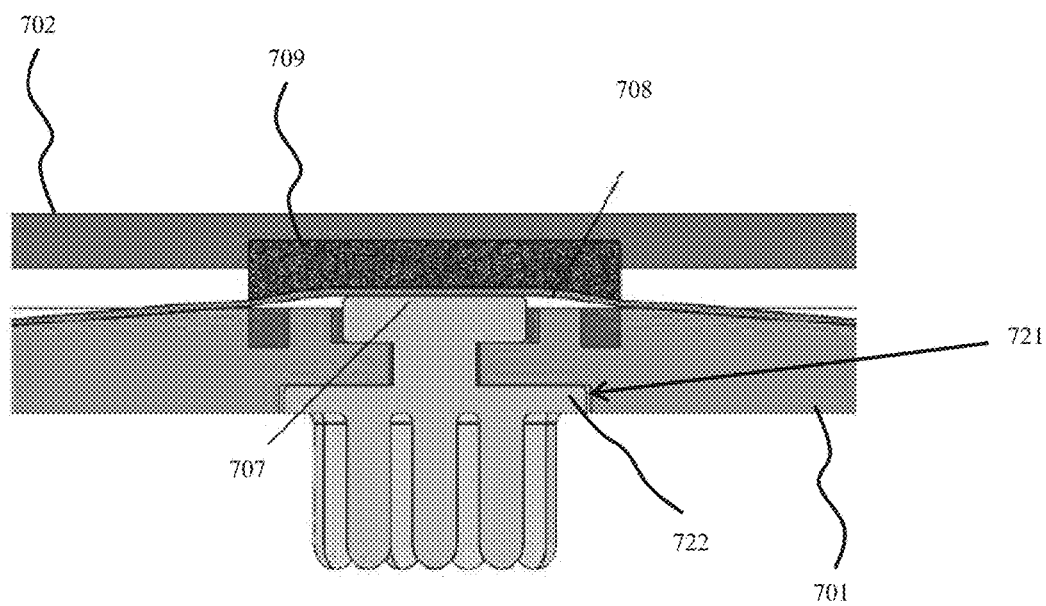
FIG. 9B is a side view of the electrode of FIG. 7 positioned in the receiving point.
Figure 10A:
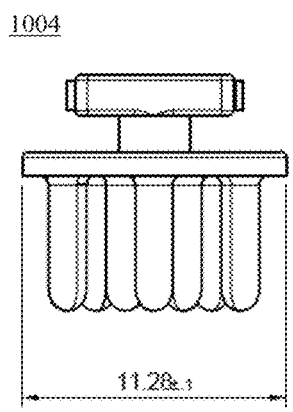
FIGS. 10A-13 illustrate the electrode of FIG. 7.
Figure 10B:
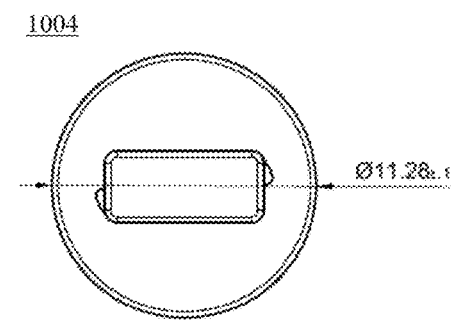
Figure 10C:
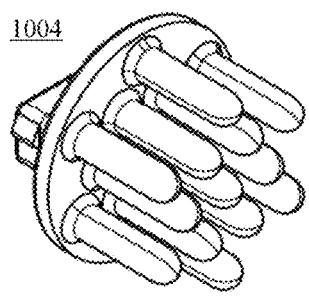
Figure 10D:
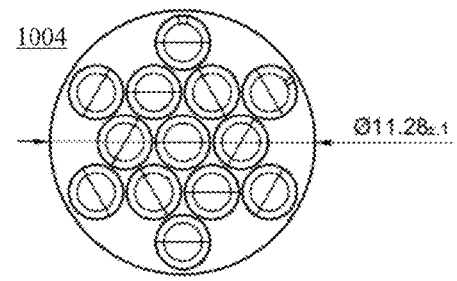
Figures 11A, 11B:
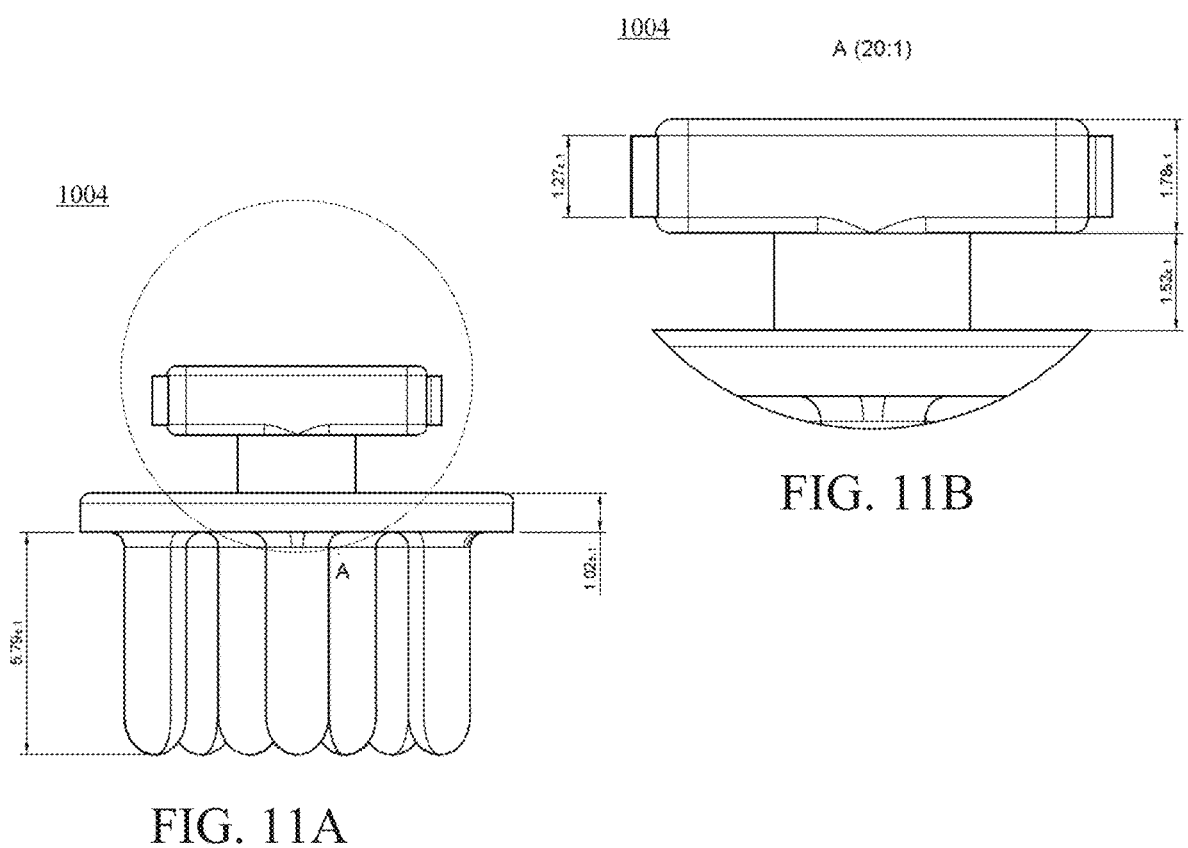
Figure 12:
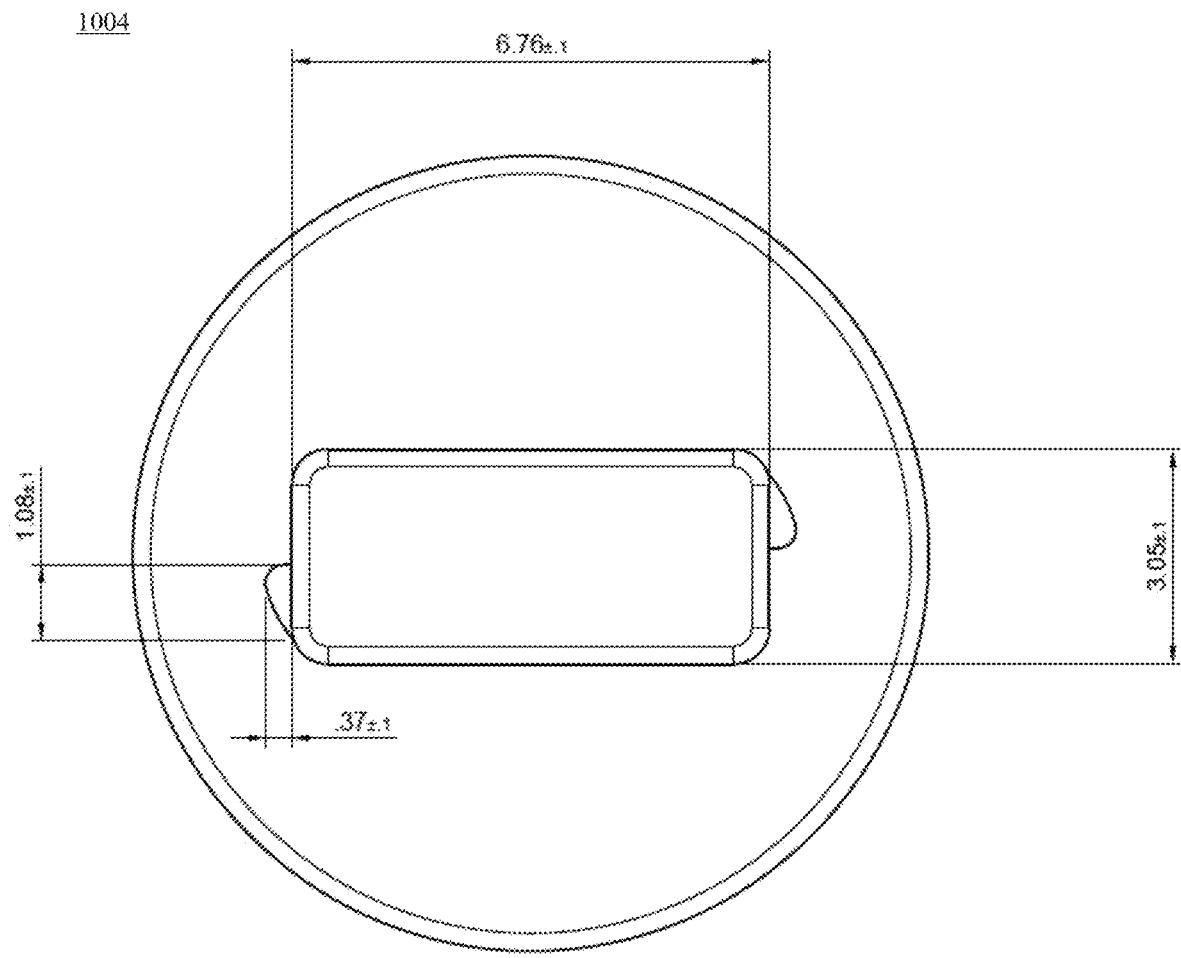
Figure 13:
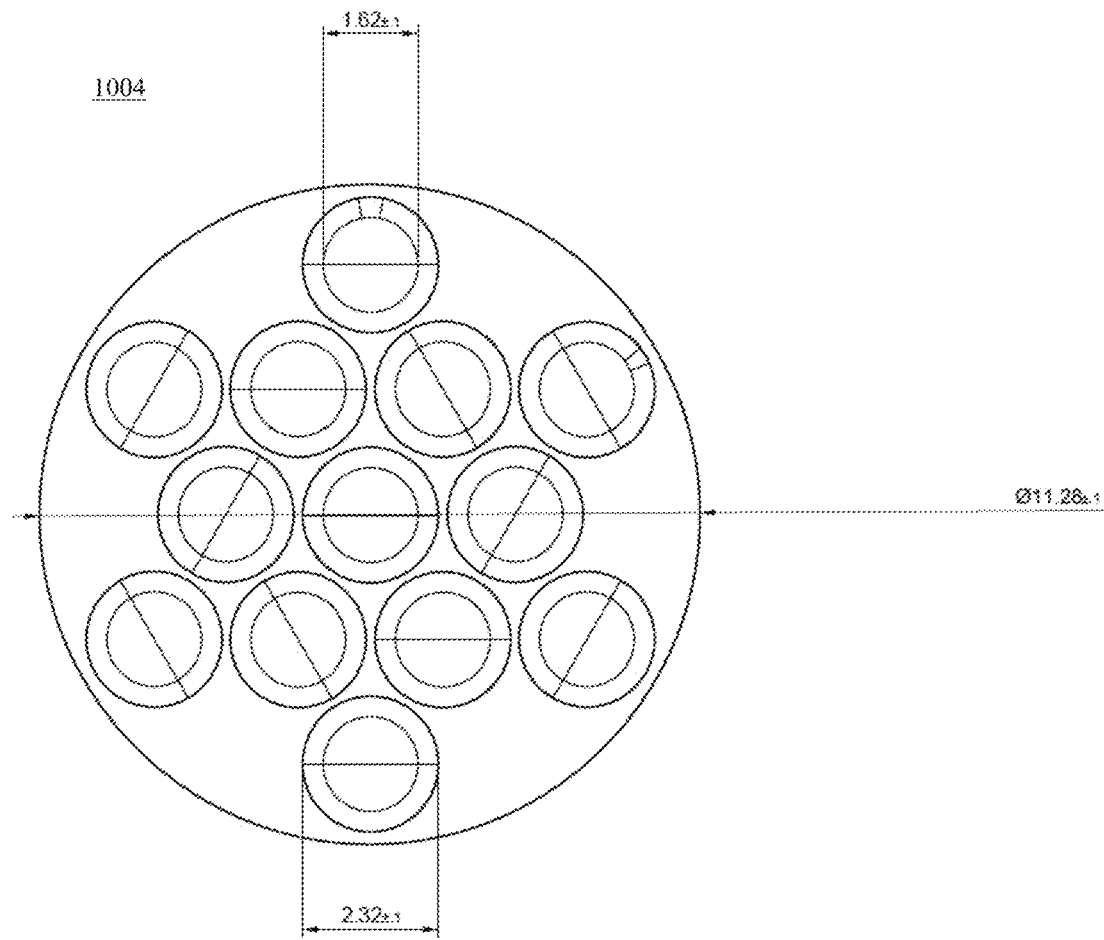
Figure 14:
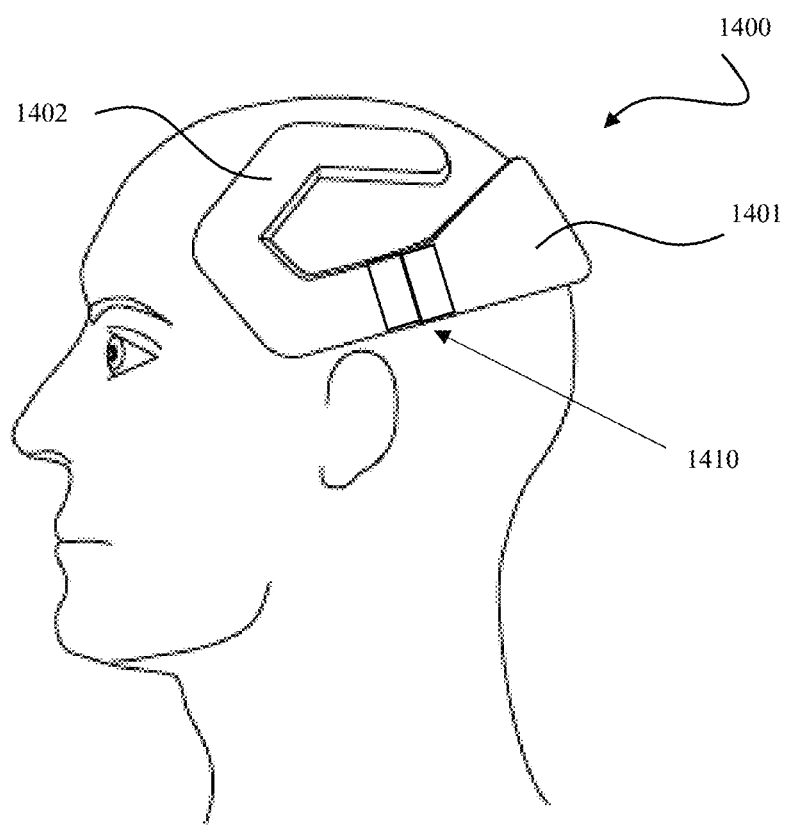
FIG. 14 is a side view of a headware for computer control including a pivoting mechanism in accordance with the present disclosure.
Figure 15:
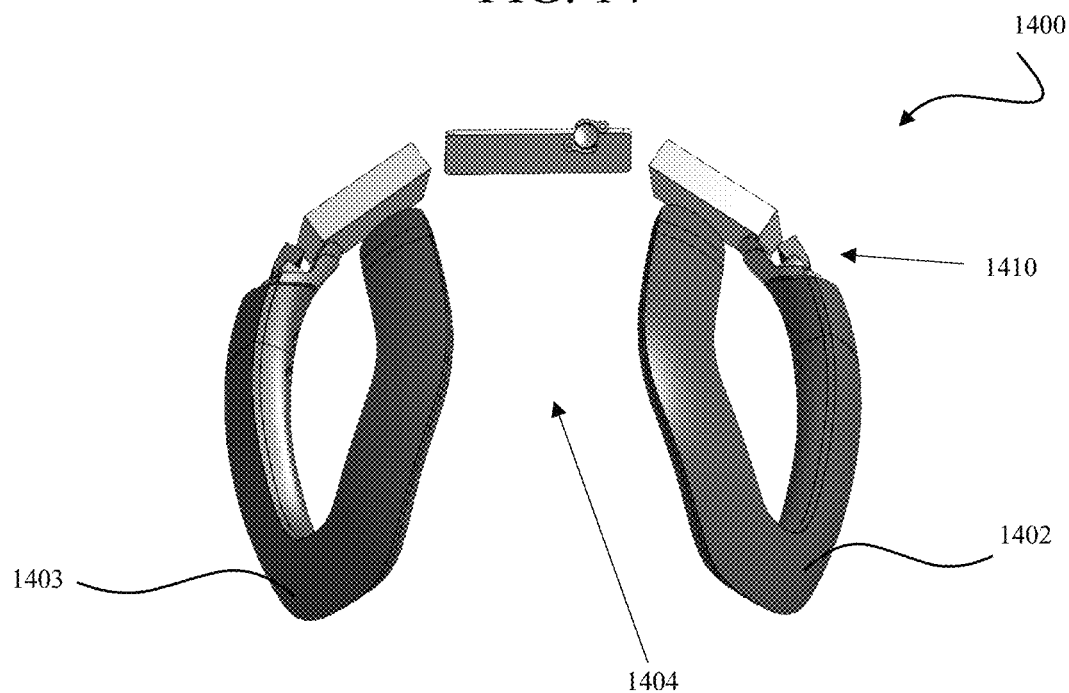
FIG. 15 is a top plan view of the headware of FIG. 14 with the body portion omitted.

Referring to FIG. 6 is an exemplary flowchart of a method of a headware controlling a computer. In block 602, the headware 100 measures electrical signals of a brain, via the sensors 106 disposed on the headware 100. In various embodiments, the sensors 106 may be electrodes. The signal is communicated from the sensors 106 to an amplifier disposed on the headware 100 and at step 604 amplified. The computing device 120 disposed on the headware then processes these electrical signals and at step 606 communicates them to an external computing device, for controlling that external computing device. For example, a user wearing the headset may want to control his computer to do tasks such as video editing or game playing.

An electrode according to an exemplary embodiment of the present disclosure will be described in more detail below with reference to FIGS. 7, 8A, 8B, 9A, 9B and 10A-13. Unless indicated otherwise, the electrode described below with reference to FIGS. 7, 8A, 8B, 9A, 9B and 10A-13 may include substantially the same technical features as those described above and thus duplicative descriptions may be omitted below.

Referring to FIGS. 7-9B, in an aspect of the present disclosure, a headware for computer control includes an inner layer 701 including a first surface 710 and a second surface 711. An outer layer 702 is disposed on the first surface 710 of the inner layer 701. The inner layer 701 may be interchangeably referred to as an inner shell and the outer layer 702 may be interchangeably referred to as an outer shell herein.

The headware includes at least one receiving point 703 for securely holding at least one sensor 704 therein. The sensor 704 may be interchangeably referred to as an electrode herein.

The receiving point 703 is positioned between the inner layer 701 and the outer layer 702. At least one sensor 704 is configured to measure electrical signals from a brain and communicate the electrical signals to a computing device. The headware sits at the top of a head and applies pressure to at least one side of the head (see, e.g., FIGS. 2A-3). The receiving point 703 include a first orifice 705 adjacent to the second surface 711 of the inner layer 701. The first orifice extends 705 in a first direction (e.g., an "X-X" direction, as illustrated, e.g., in FIG. 8A). A second orifice 706 is in communication with the first orifice 705 and extends along a second direction (e.g., a "Y-Y" direction, as illustrated, e.g., in FIG. 8A) crossing the first direction. The first direction may be substantially perpendicular to the second direction. The at least one sensor 704 includes a protrusion 707 configured to be rotatably engaged with the second orifice 706 after having passed through the first orifice 705. The first orifice 705 may have a shape corresponding with a shape of the protrusion 707 (e.g., a substantially rectangular shape). The second orifice 706, configured to allow rotation of the protrusion 707, may have a substantially circular shape. A post 733 of the protrusion 707 may have a substantially cylindrical shape.

In an aspect of the present disclosure, the receiving point 703 includes a deformable circuit board 708 positioned between the inner layer 701 and the outer layer 702. The protrusion 707 of the at least one sensor 704 directly contacts the deformable circuit board 708 (e.g., at an electrical contact 725—see, e.g., FIG. 8A) when the protrusion 707 is rotatably engaged with the second orifice 706. This may cause the deformable circuit board 708 to compress slightly against an electrical contact 726 of the sensor 704, thus increasing a strength of contact (and a corresponding electrical connection) between the electrical contact 726 of the sensor 704 and the electrical contact 725 of the deformable circuit board 708.

In an aspect of the present disclosure, the receiving point 703 includes a deformable block 709 between the deformable circuit board 708 and the outer layer 702. The deformable block 709 may be a foam pad, or a polyimide flexible material, a fiberglass material, or any combination of foam pad, polyamide flexible material, and a fiberglass material. A first surface of the foam pad 709 may be in direct contact with an inner surface of the outer layer 702 and a second surface of the foam pad 709 may be in direct contact with an inner surface of the deformable circuit board 708. The deformable block 709 may be positioned in a recess formed in the outer shell 702.

In an aspect of the present disclosure, the receiving point 703 includes an indent 721 and the electrode 704 further includes an electrode base 722. The indent 721 of the receiving point 703 is configured to receive the electrode base 722 therein.

In an aspect of the present disclosure, at least one sensor 704 includes an array of electrode prongs 723. The number of electrode prongs 723 may vary from 5 to 20, and lengths of the electrode prongs may also vary (see, e.g., FIGS. 10A-13).

According to an exemplary embodiment, support posts 731 and 732 may extend from an inner side of inner layer 701. The support posts 731 and 732 provide a support structure for the deformable circuit board 708 when an electrode is not positioned in the receiving point 703, thus preventing warping to deformable circuit board 708. Thus, an occurrence of damage to the deformable circuit board 708 may be reduced or eliminated.

The electrodes described herein may include a base material formed of Acrylonitrile butadiene styrene (ABS), or another similar thermoplastic. Plating of the electrode may include Gold, Silver, or Silver/Silver Chloride. The plating may have a thickness of approximately 5 microns. The electrode may include a base material of electrically conductive thermoplastic.

As used herein, the term "server," "computer server," "central server," "main server," and like terms are used to indicate a computer or device on a network that manages data.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for controlling components of the headset and communicating data.

As used herein, the term "processor," "computing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, and video game consoles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random-access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing-based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like. In still some embodiments, the display is a combination of devices such as those disclosed herein.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The headset described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

Unless otherwise indicated below, and the fullest extent technically feasible, the headware for computer control described below with reference to FIGS. 14 to 27 may include or employ the same technical features as those described above with reference to FIGS. 1 to 13. The embodiments described below with reference to FIGS. 14-25 increase comfortability for a user wearing the headware described herein, and also increase reliability of the connection between the electrode tips described herein and a user's head.

Referring to FIGS. 14-20, a headware for computer control 1400 includes a body portion 1401. A first arm 1402 is pivotally coupled to the body portion 1401 and a second arm 1403 is pivotably coupled to the body portion 1401. The body portion 1401 extends around a back of a user's head and the first and second arms 1402, 1403 extend along opposite sides of the user's head.

The first arm and the second arm 1402, 1403 define a central region 1404 therebetween (e.g., an area between opposite sides of the user's head). A pivoting mechanism 1410 is coupled to the first arm or the second arm 1402, 1403 and the body portion 1401. The pivoting mechanism 1410 pivots the first arm 1402 or the second arm 1403 towards or away from the central region 1404 between the first arm 1402 and the second arm 1403. This allows the headware 1400 to adjust to heads of varying sizes and shapes, and also securely attaches the headware 1400 to the user's head while maintaining constant contact between the sensors described herein and the user's head. While pivoting of the first and second arms 1402, 1403 away from the central region 1404 is generally contemplated, the present disclosure is not limited thereto and the first and second arms 1402, 1403 may also be configured to bend somewhat toward the central region 1404 as a result of the biasing action of the biasing member (see, e.g., biasing member 1601 in FIG. 16).

The pivoting mechanism 1410 includes the biasing member 1601 (e.g., a spring, such as a compression spring or a torsion spring) secured in the body portion 1401. The biasing member 1601 biases the first arm 1402 or the second arm 1403 toward the central region 1404.

Figure 16:
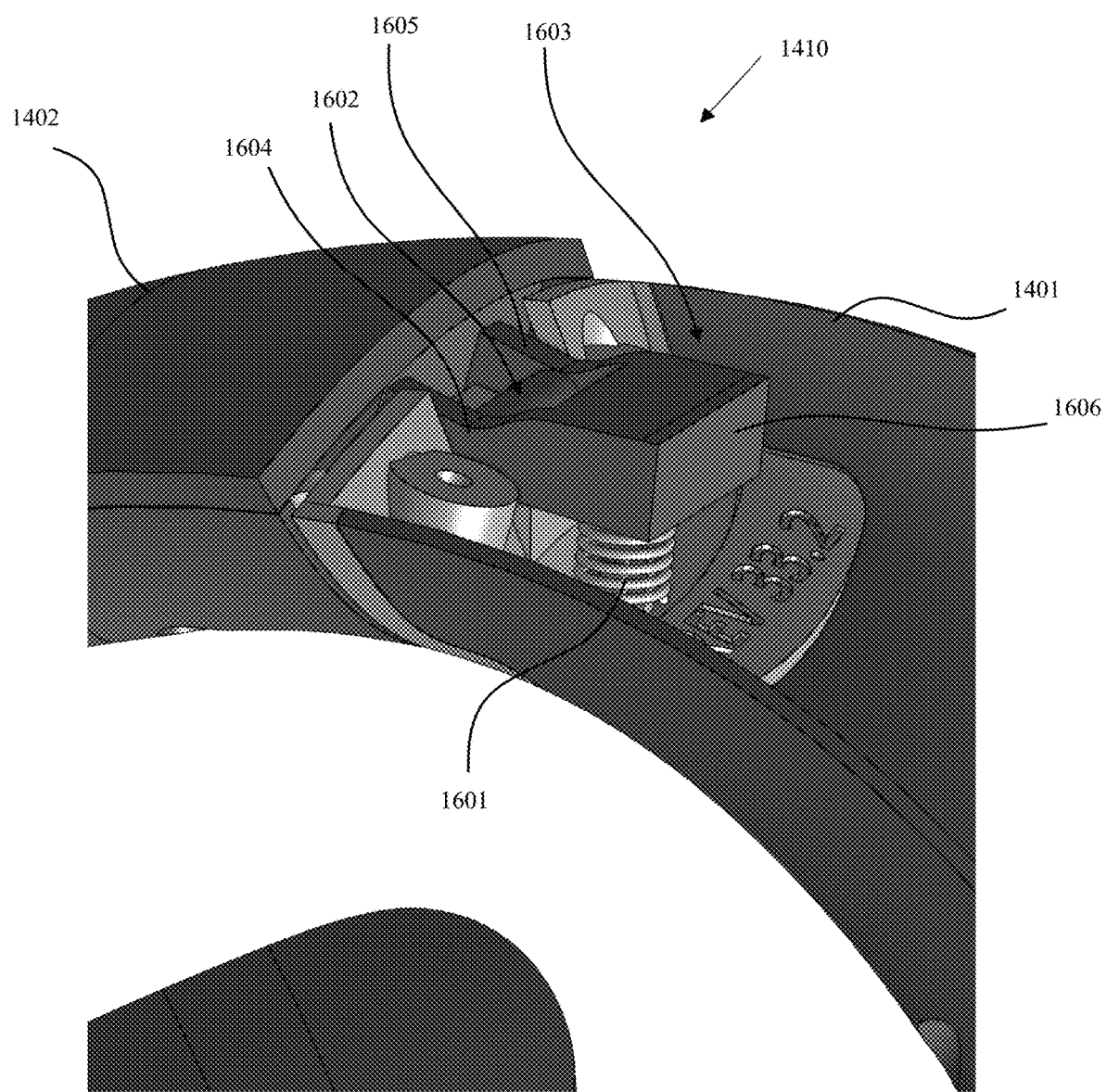
FIG. 16 is perspective view of an exemplary pivoting mechanism positioned in an inner space formed between the inner shell and the outer shell of the headware of FIG. 14.
Figure 17:
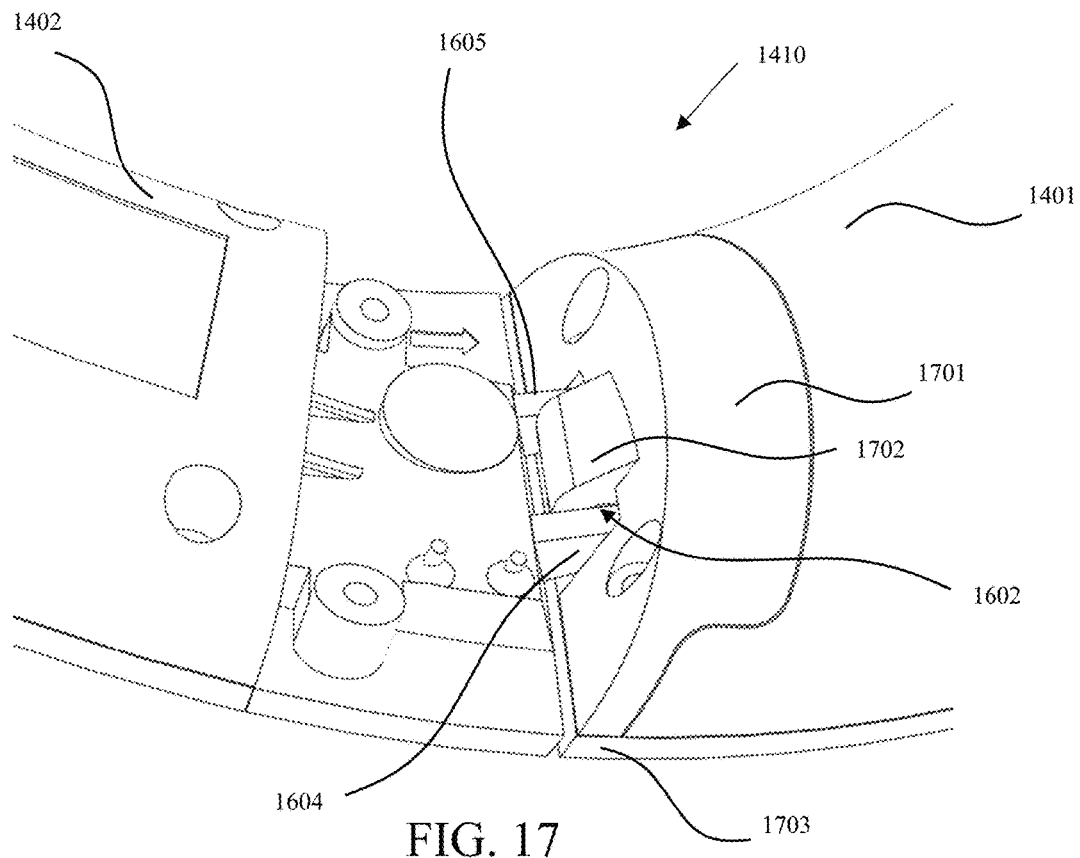
FIG. 17 is a perspective view of the pivoting mechanism of FIG. 14 with the biasing member and hammer covered by a biasing member cover.
Figure 18:
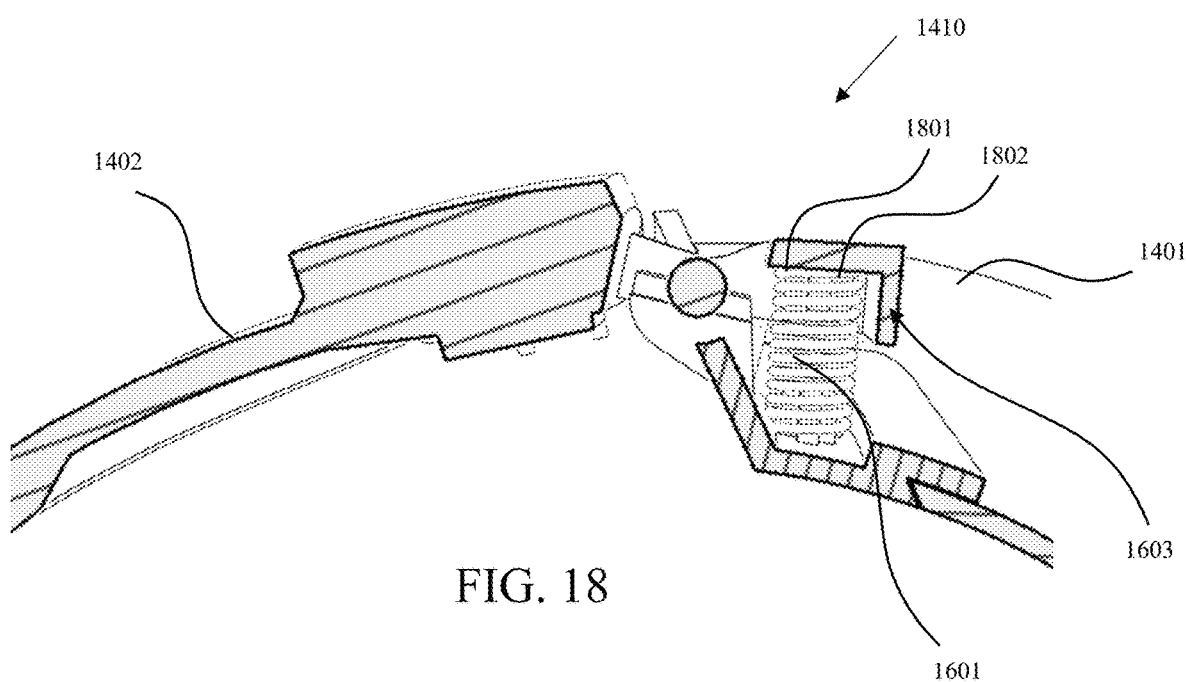
FIG. 18 is a top plan view of the pivoting mechanism of FIG. 14.

A pivot pin 1602 secures the first arm 1402 or the second arm 1403 to the body portion 1401 (see, e.g., pivot pin 1602 in FIG. 16). The first arm 1402 or the second arm 1403 pivot about the pivot pin 1602 when the first arm 1402 or the second arm 1403 pivot with respect to the body portion 1401. The biasing member 1601 biases the first arm 1402 or the second arm 1403 towards the central region 1404 when the first arm 1402 or the second arm 1403 is pivoted away from the central region 1404. The biasing member 1601 may be arranged about the pivot pin 1602.

In an aspect of the present disclosure, a hammer 1603 extends from the first arm 1402 or the second arm 1403. The hammer 1603 applies a force against the biasing member 1601 when the first arm 1402 or the second arm 1403 is pivoted with respect to the body portion 1401.

The hammer 1603 includes first projection 1604 and a second projection 1605 extending from the first arm 1402 or the second arm 1403. The first projection 1604 is spaced apart from the second projection 1605 and defines a space into which the pivoting pin 1602 can be disposed therebetween. A sleeve may be formed between the first projection 1604 and the second projection 1605 to receive the pivoting pin 1602. An inner surface 1801 of the hammer 1603 is configured to directly contact an outer surface 1802 of the biasing member 1601 to apply force to the biasing member 1601 when the first arm 1402 or the second arm 1402 is pivoted away from the central region 1404. The hammer 1603 may include sidewalls 1606 forming a downward facing cavity into which on upper portion of the biasing member 1601 is positioned and secured. The pivot pin 1602 extends between the first projection 1604 and the second projection 1605 of the hammer 1603. Thus, the pivot pin 1602 may be employed to couple the first and second projections 1604, 1605 of the hammer 1603 to the body portion 1401.

In some aspects of the disclosure, a biasing member cover 1701 is removably coupled to the body portion 1401 and covers the biasing member 1601 in the body portion 1401. The biasing member cover 1701 includes a pivot pin cap 1702 configured to extend between the first projection 1604 and the second projection 1605 of the hammer 1603. Thus, biasing member cover 1701 covers an end 1703 of the body portion 1401 facing the first and second arms 1402, 1403. A similar cap may cover ends of each of the first and second arms 1402, 1403 facing the body portion 1401. Each cap may be removably secured by screws projecting through the cap into corresponding bores formed at the ends of the arms or the body portion 1401, respectively. Each cover (e.g., the biasing member cover) includes a number of orifices aligned with a corresponding orifice formed in an interior of the body portion 1401 adjacent each of the arms 1402, 1403. Each orifice receives a screw to secure the cap. The terms "cap" and "cover" may be used interchangeably herein.

Figure 19:
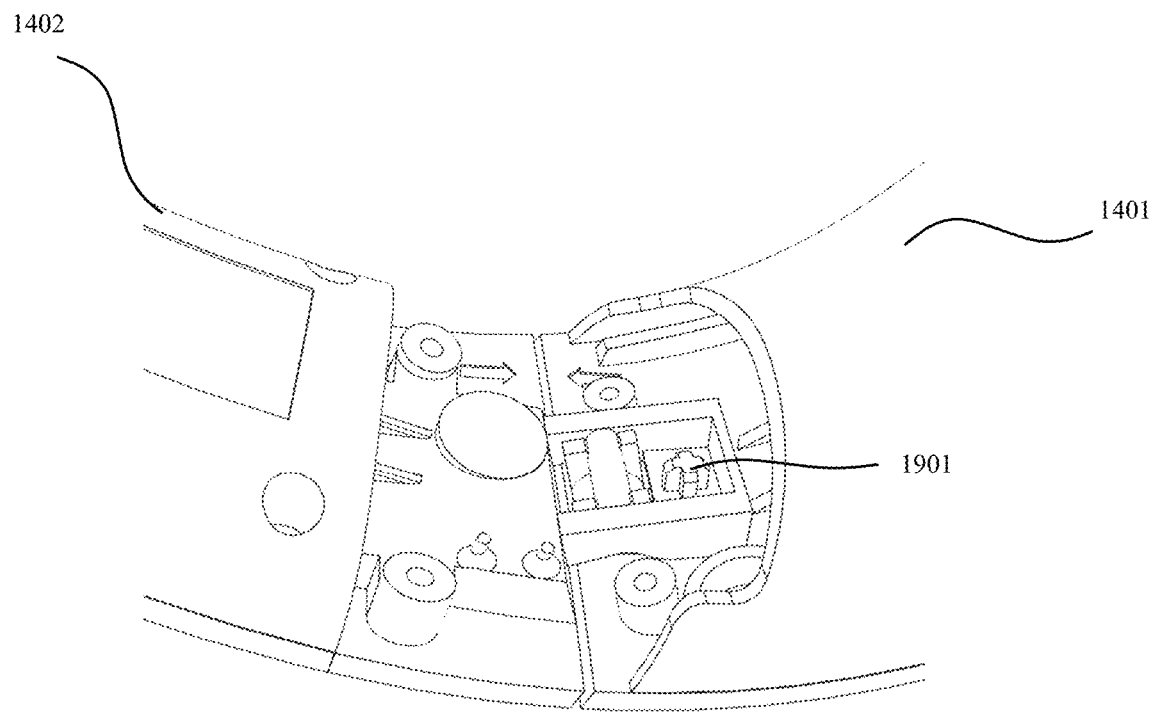
FIG. 19 is a perspective view of the pivoting mechanism of FIG. 14 with the biasing member cover and the biasing member omitted.
Figure 20:
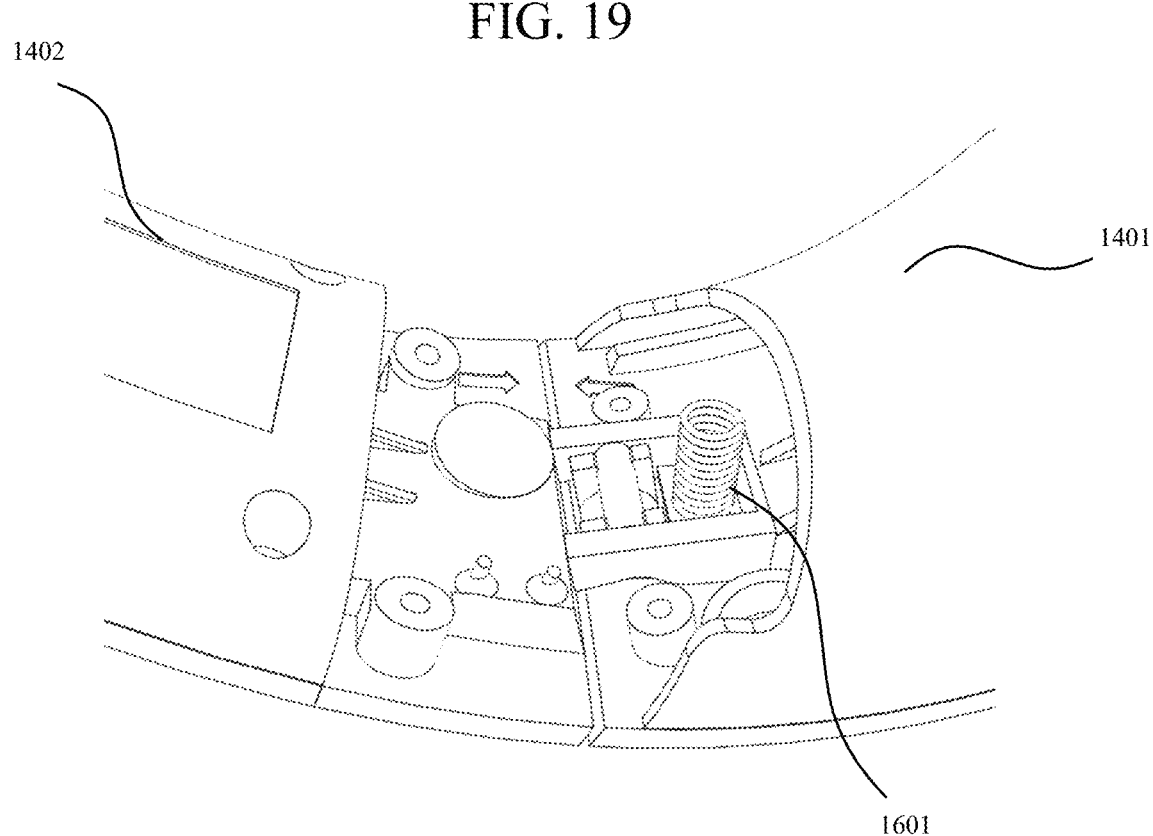
FIG. 20 is a perspective view of the pivoting mechanism of FIG. 19 with the biasing member secured to a post secured to an inner surface of the body portion.
Figure 21:
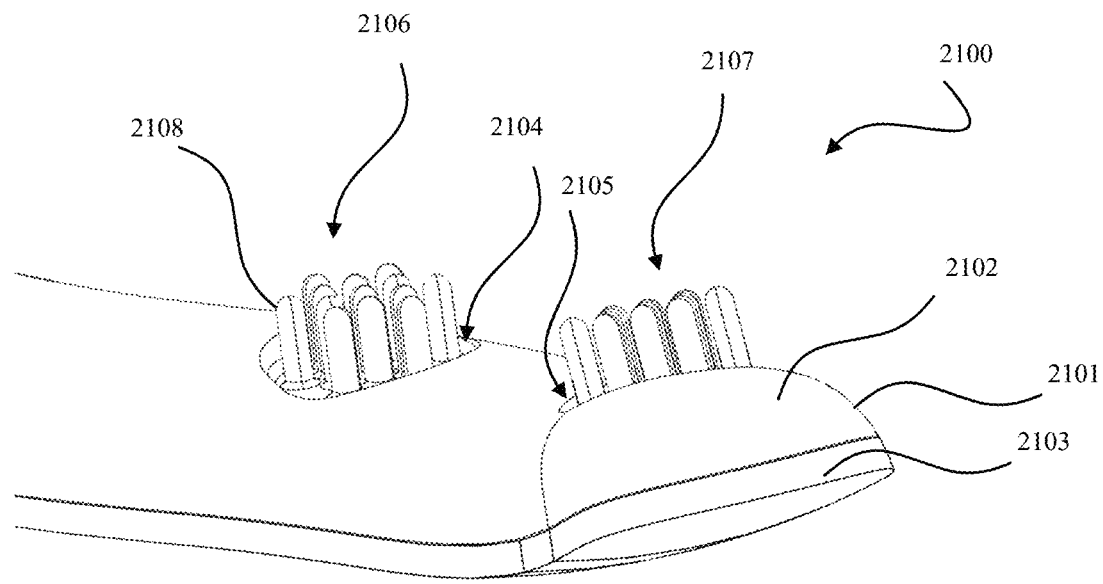
FIG. 21 is a perspective view of two receiving points of headware for computer control with electrode tips of pivotable sensors respectively extending therefrom in accordance with the present disclosure.
Figure 22:
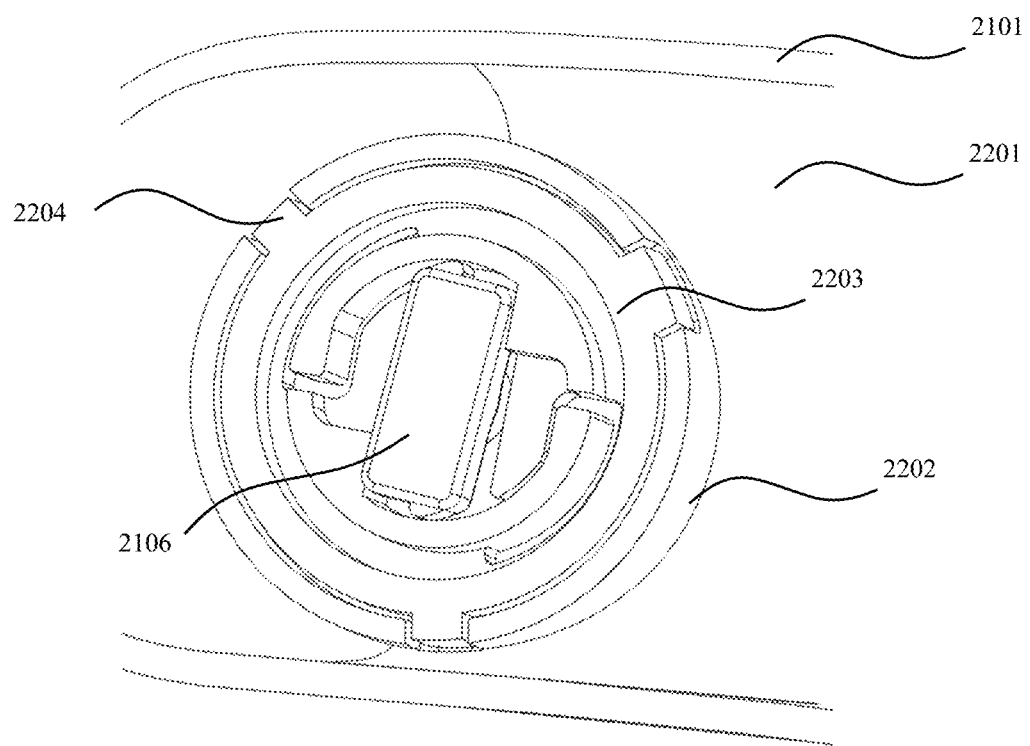
FIG. 22 is an interior view of an inner shell of FIG. 21 showing bottom surfaces of an electrode holder disposed in an electrode holder receptor and a protrusion of a sensor position in the electrode holder.
Figure 23:
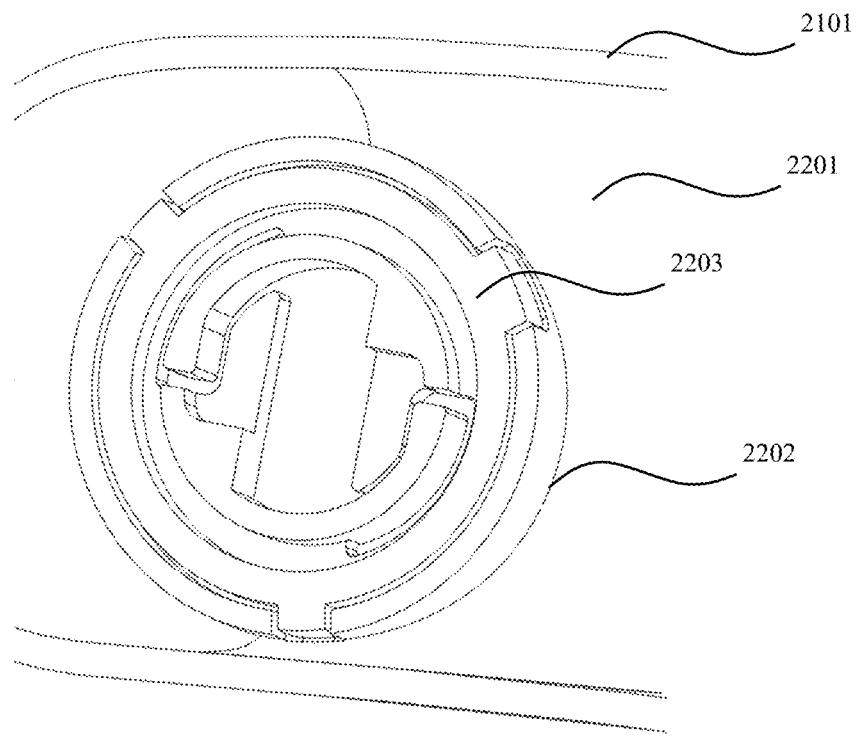
FIG. 23 is an interior view of the inner shell of FIG. 22 showing the electrode holder disposed in the electrode holder receptor with the sensor omitted.
Figure 24:
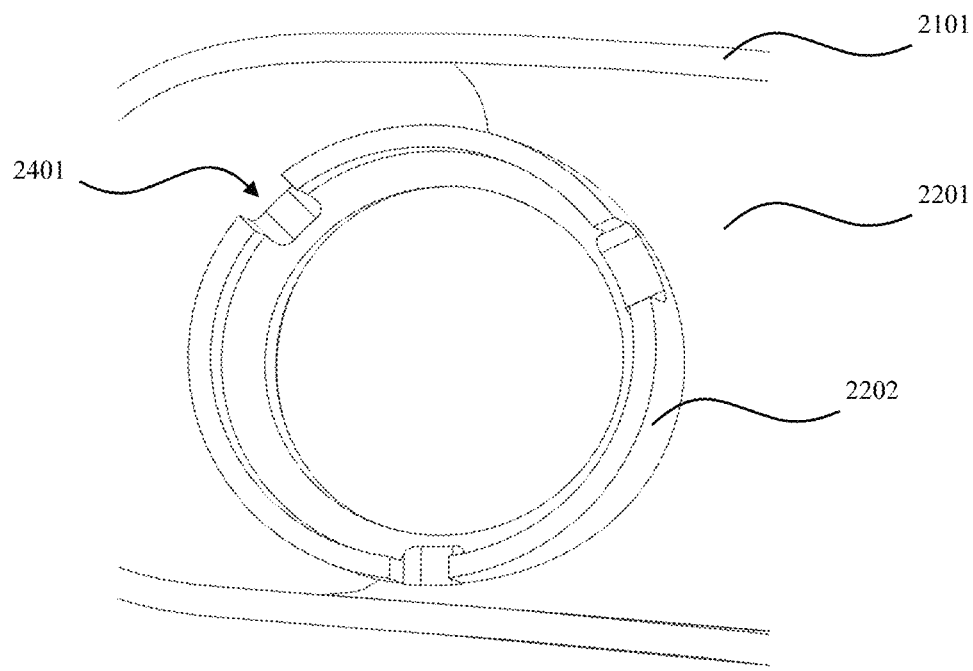
FIG. 24 is an interior view of the inner shell of FIG. 23 showing the electrode holder receptor with the electrode holder omitted from the electrode holder receptor.
Figure 25:
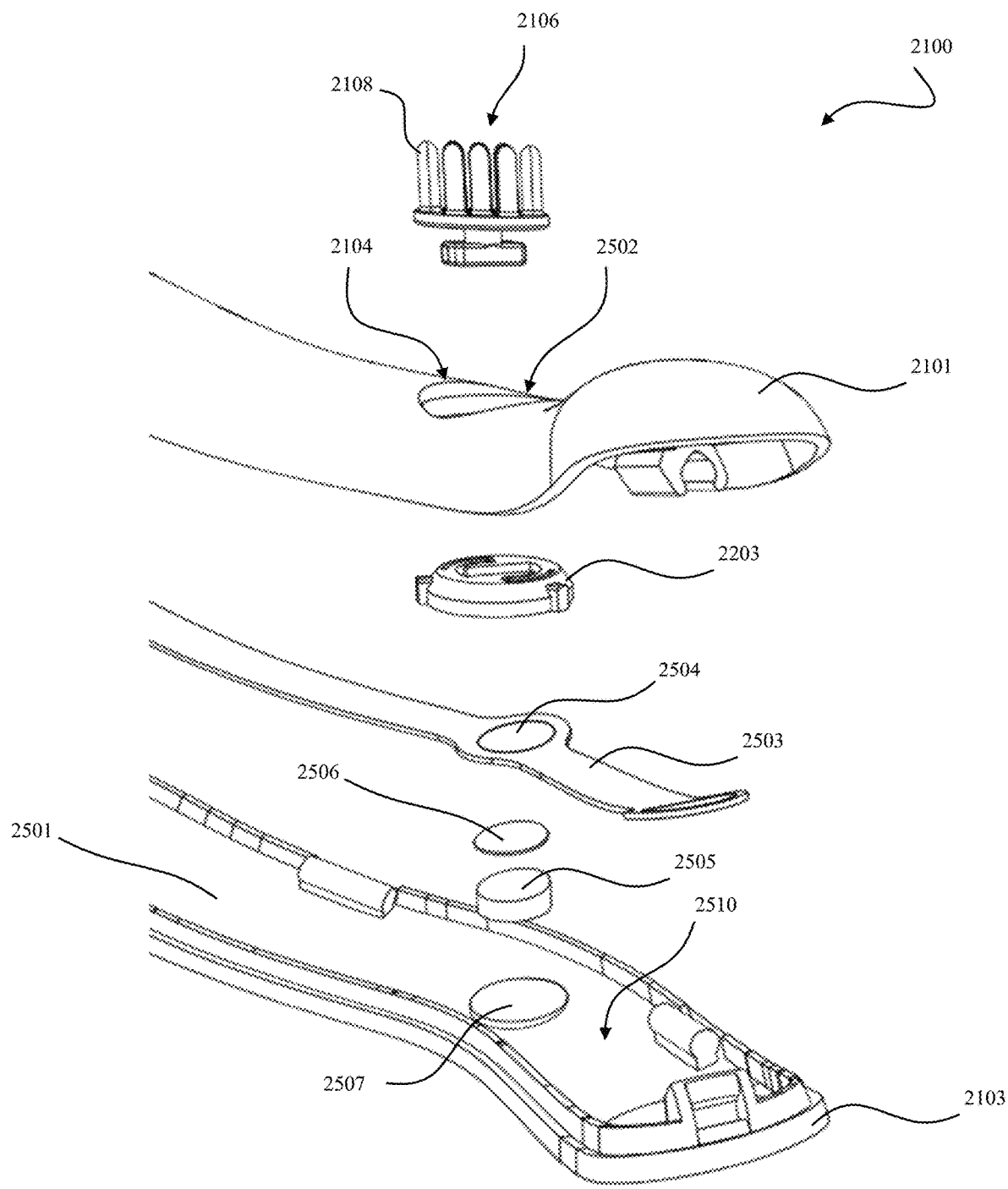
FIG. 25 is an exploded view of a receiving point of FIG. 21.

Referring particularly to FIGS. 19 and 20, a post 1901 is secured to an inner surface of the body 1401. The post 1901 may be employed to secure the biasing member 1601 to the body portion 1401. The post 1901 may be a projection integrally formed with the body portion 1401 (e.g., through a common molding process in which the body portion and the post are simultaneously formed). The post 1901 extends from an inner surface of the outer shell into the inner space formed between the inner shell and the outer shell of the headware.

Unless otherwise indicated below, the headware for computer control 2100 described with references to FIGS. 21-25 is substantially the same as the headware for computer control described above, and thus duplicative descriptions may be omitted below.

Referring to FIGS. 21-25, the headware for computer control 2100 includes an inner shell 2101 including an inner surface 2201 (see, e.g., FIG. 22) and an outer surface 2102. An outer shell 2103 is coupled to the inner shell 2101. The outer shell 2103 includes an inner surface 2501 (see, e.g., FIG. 25). The inner surfaces 2201, 2501 of the inner and outer shells 2101, 2103 face each other. The inner shell 2102 and the outer shell 2103 define an inner space 2510 (see, e.g., FIG. 25) between the inner shell 2101 and the outer shell 2103. At least one receiving point (see, e.g., receiving points 2104 or 2105 in FIG. 21) is formed in the inner shell 2101. At least one sensor (see, e.g., sensors 2106 or 2107 in FIG. 21) is movably coupled in the at least one receiving point. The sensors each include a plurality of electrode tips 2108. The sensors measure electrical signals from a brain and communicate the electrical signals to a computing device, as described herein. The headware 2100 is secured to a user's head and applies pressure to at least one side of the head such that the electrode tips 2108 remain in direct contact with the user's head.

The receiving point 2104 includes an orifice 2502 (see, e.g., FIG. 25) formed in the inner layer 2101. Electrode tips 2108 of the sensor 2106 extend through the orifice 2502. An electrode holder receptor 2202 extends from the inner surface 2201 of the inner layer 2101 into the inner space 2510 between the inner layer 2101 and the outer layer 2103. An electrode holder 2203 is movably positioned in the electrode holder receptor 2202. The sensor 2106 is rotatably secured to the electrode holder 2203. A flexible circuit 2503 includes at least one electrical contact 2504. The sensor 2106 is electro-mechanically connected with the electrical contact 2504. A deformable block (e.g., a foam block) 2505 is positioned on the inner surface 2501 of the outer shell 2103. The deformable block 2505 allows the electrode holder 2203 and the sensor 2106 to move with respect to the inner shell 2103 to maintain contact between the electrode tips 2108 of the sensor 2106 and the user's head. For example, the sensor 2106 may tilt to conform to a shape or size of a user's head to maintain continuous contact between the electrode tips 2108 and the user's head. The deformable block 2505 allows the sensor 2106 to remain continuously electro-mechanically connected with the electrical contact 2504 in a plurality of positional orientations of the sensor 2106. The headware 2100 includes a plurality of sensors and each sensor may move independently within its own receiving point.

In some aspects of the disclosure, a stiffening pad 2506 is disposed between the electrical contact 2504 and the deformable block 2505. The stiffening pad 2506 prevents warping or deformation of the flexible circuit 2503. The stiffening pad 2506 may include a polyimide material. An adhesive or double-sided tape may be used to secure either side of the deformable block 2505 to immediately adjacent structures, and similarly an adhesive or double-sided tape may secure either side of the stiffening pad 2505 to adjacent structures.

In some aspects of the disclosure, a shelf 2507 is formed on the inner surface 2501 of the outer shell 2103. The shelf 2507 supports a bottom surface of the deformable block 2505. The deformable block 2505 may be secured to the shelf.

In some aspects of the disclosure, the electrode holder 2203 includes projections 2204 extending circumferentially outwardly from the electrode holder 2203. The electrode holder receiver 2202 defines notches 2401 (see, e.g., FIG. 24) into which the projections 2204 are respectively disposed. The notches 2401 allow the electrode holder 2203 and the at least one sensor 2106 secured thereto to tilt with respect to the inner shell 2101.

In some aspects of the disclosure, the electrode holder 2203 includes three projections 2204 and the electrode holder receptor 2202 includes three notches 2401. The three notches 2401 may be equally circumferentially spaced apart from each other about the electrode holder receptor 2202.

Figure 26:
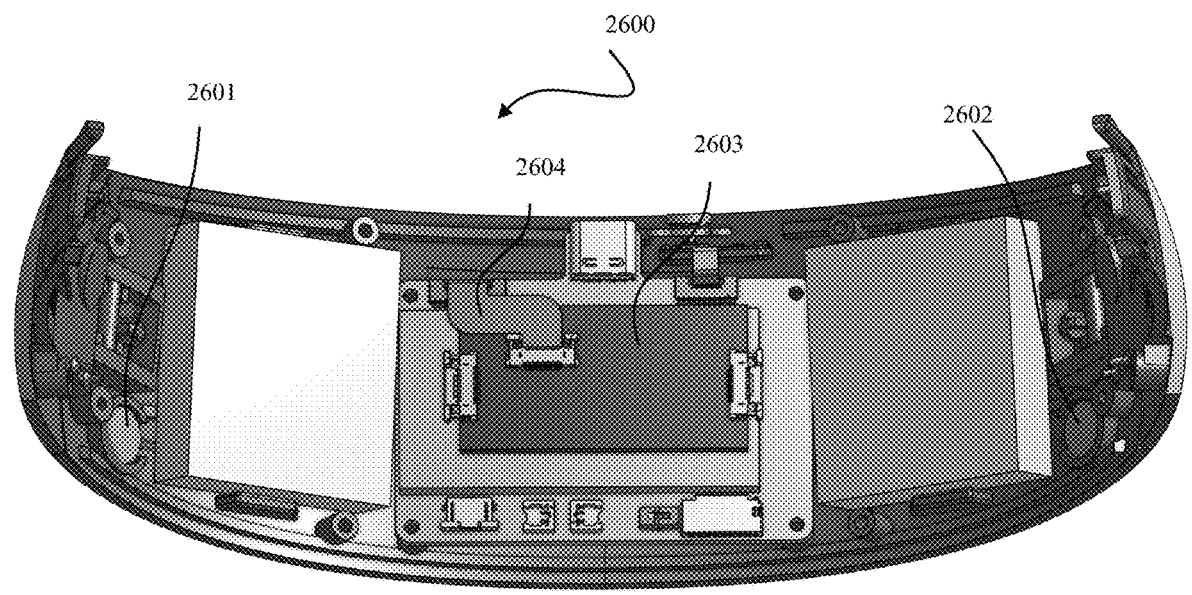
FIG. 26 is an interior view of a body portion of a headware for computer control showing a haptic motor system and two haptic motors in accordance with the present disclosure.
Figure 27:
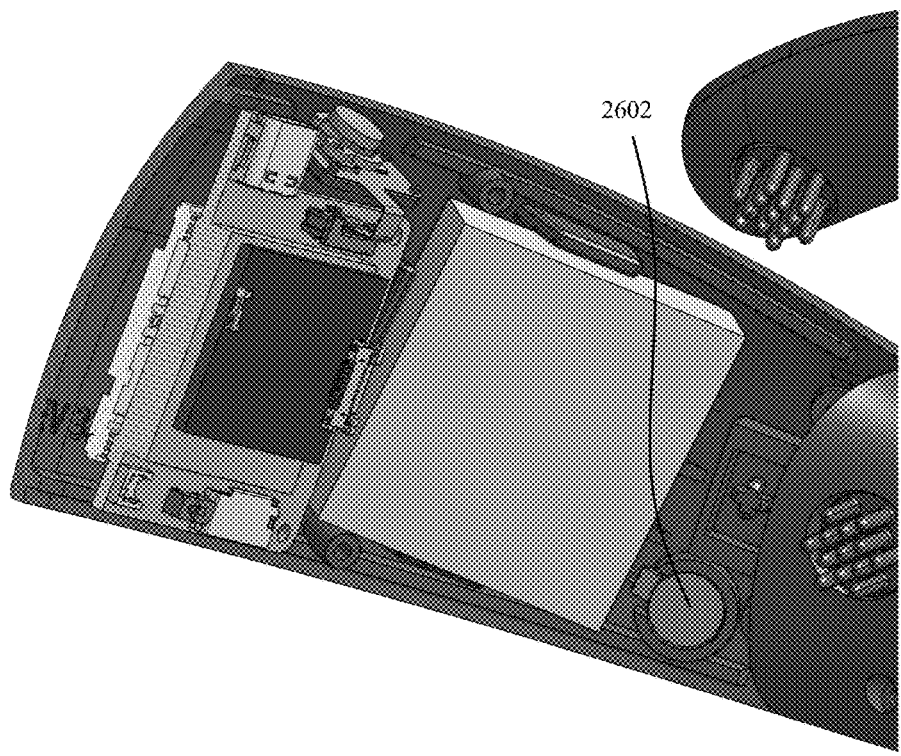
FIG. 27 is an expanded view of a haptic motor of FIG. 26 showing wiring of the haptic motor.

Referring to FIGS. 26 and 27, a haptic motor system 2600 is positioned in the inner space between the inner shell and the outer shell. The haptic motor system 2600 includes at least one haptic motor (e.g., haptic motor 2601 or 2602). The haptic motor system 2600 delivers tactile signals to the user's head. For example, the tactile signal may be a vibration, or a pattern of vibrations delivered to the user's head to alert the user or communicate information from the headware to the user.

In some aspects of the disclosure, the haptic motor system 2600 includes at least two haptic motors 2601 and 2602 positioned at opposite sides of the body portion of the headware.

In some aspects of the disclosure, a central processing unit 2603 is in electrical communication with at least two haptic motors 2601 and 2602. The haptic motors 2601 and 2602 can be individually controlled by the central processing unit 2603. At least one haptic motor connector 2604 is connected with haptic motors 2601 and/or 2602.

Unless otherwise indicated below, the headware for computer control described with references to FIGS. 28-38 is substantially the same as the headware for computer control described above, and thus duplicative descriptions may be omitted below.

Figure 28:
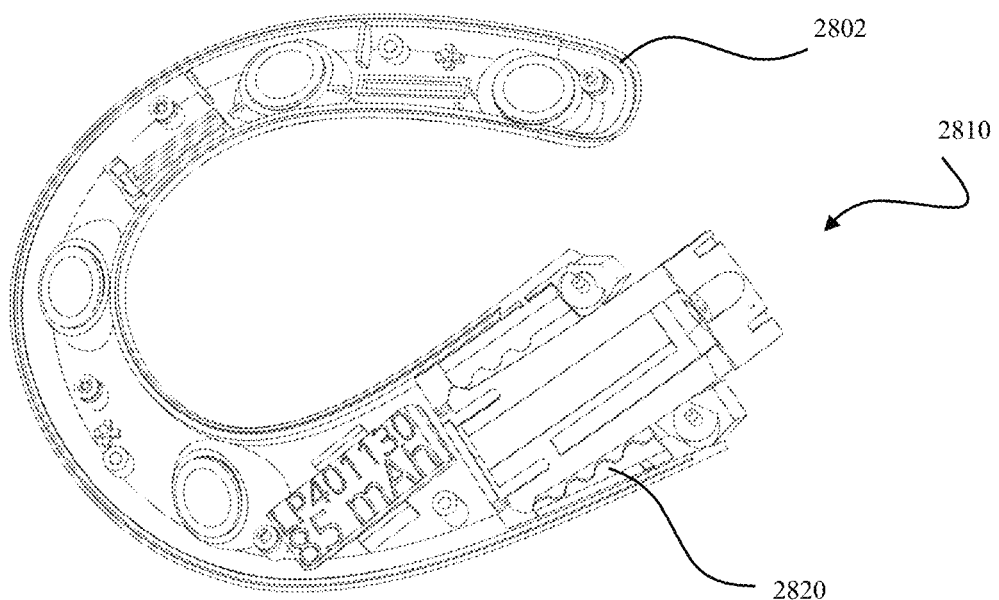
FIG. 28 is an internal, side view of an arm of a headware for computer control in accordance with the present disclosure.
Figure 29:
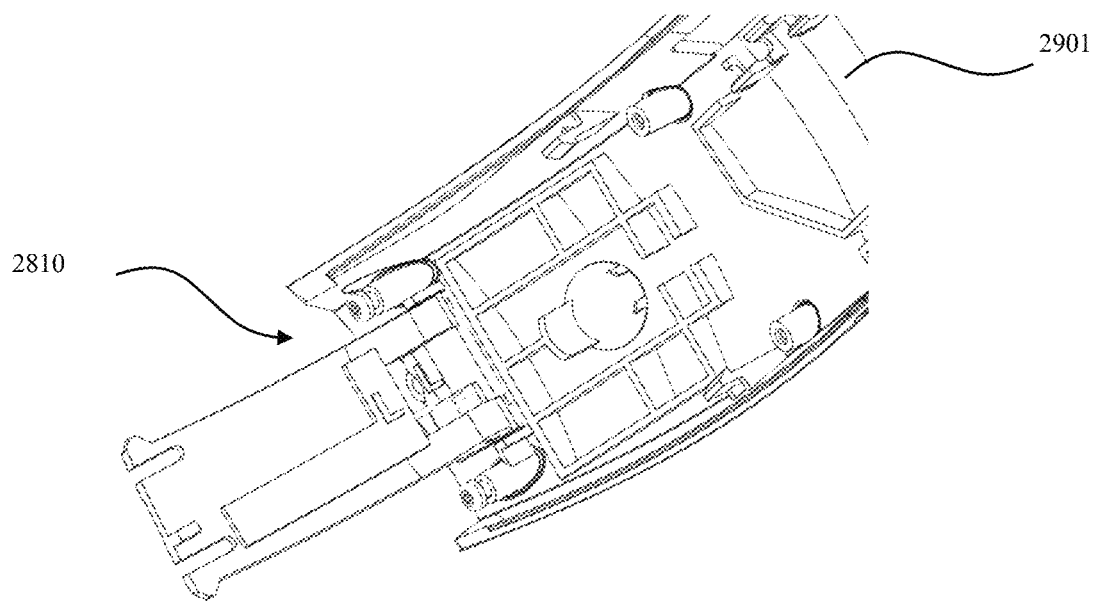
FIG. 29 is a perspective view of a pivoting mechanism secured to a body portion of the headware for computer control of FIG. 28.
Figure 30:
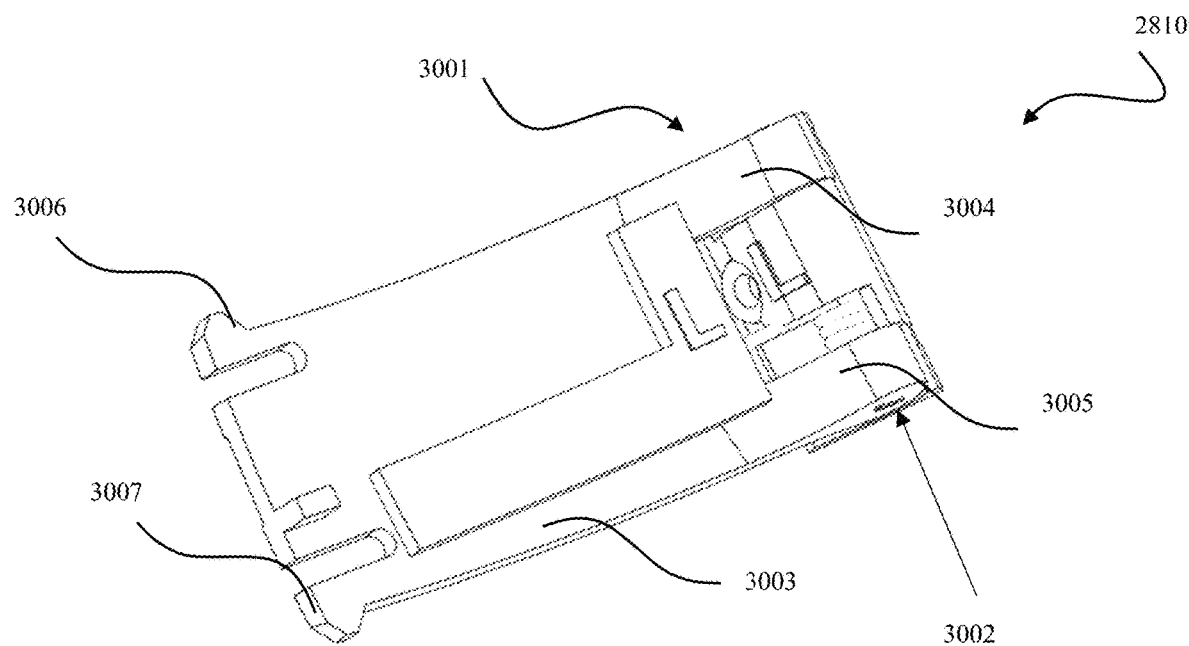
FIG. 30 is a perspective view of the pivoting mechanism of FIG. 29 including an extension arm rotatably secured to the pivoting mechanism.
Figure 31:
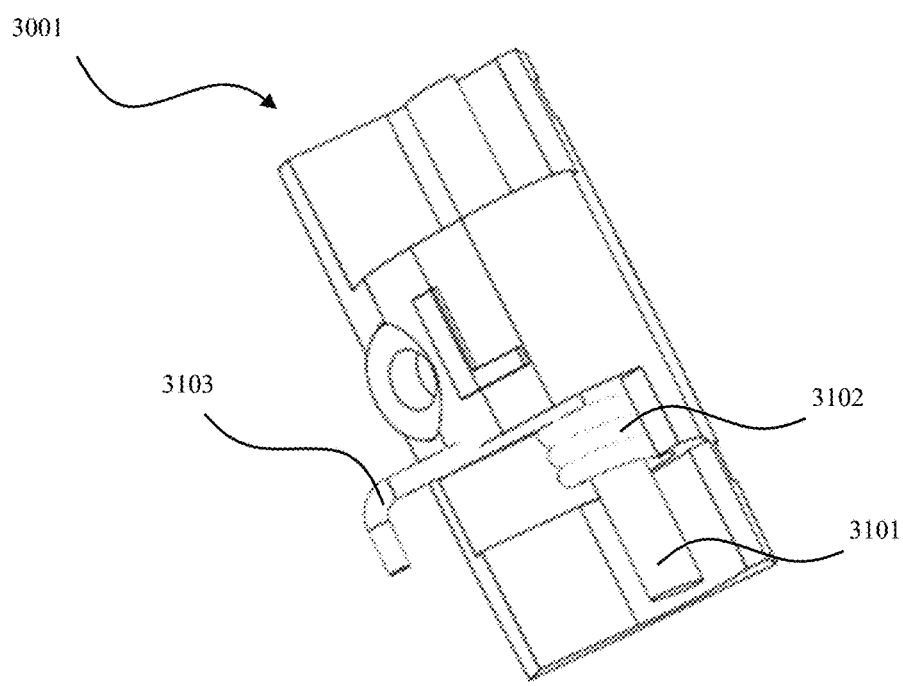
FIG. 31 is a perspective view of the pivoting mechanism of FIG. 29.
Figure 32:
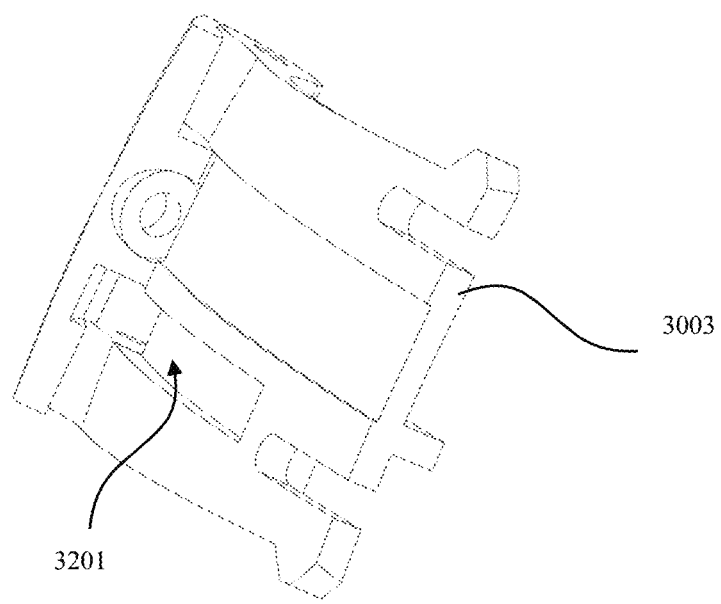
FIG. 32 is a rear, perspective view of the extension arm of FIG. 30.
Figure 33:
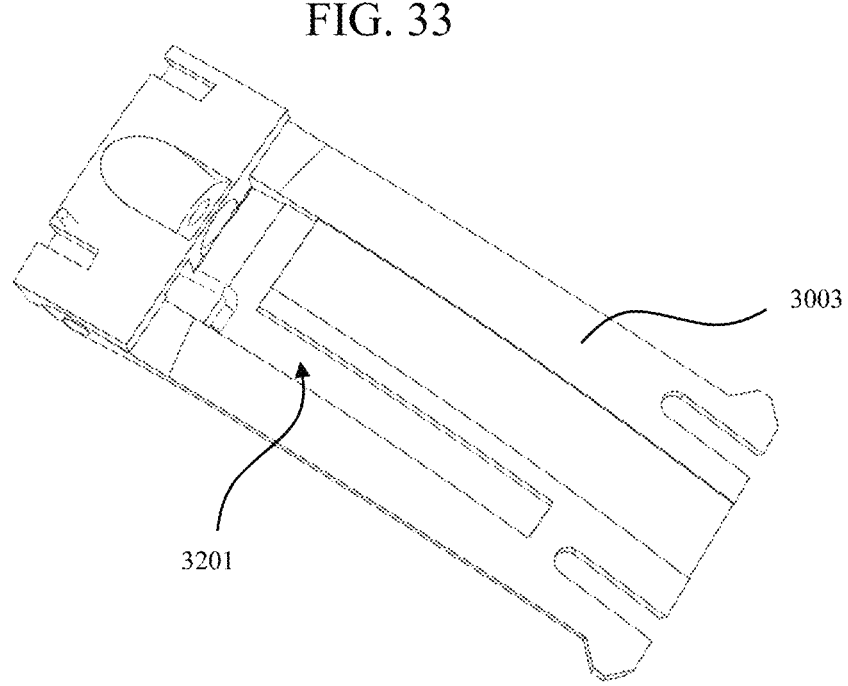
FIG. 33 is a lateral, perspective view of the extension arm of FIG. 30.
Figure 34:
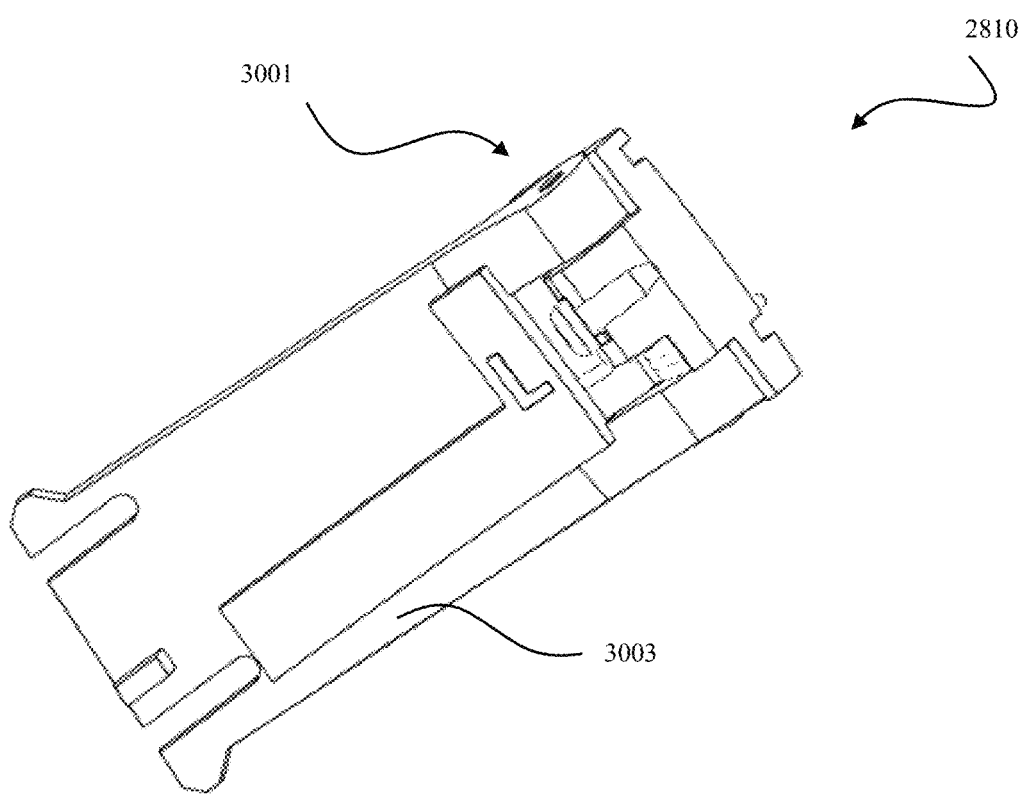
FIG. 34 is a medial, perspective view of the extension arm of FIG. 30.

Referring to FIGS. 28-38, a pivoting mechanism 2810 pivotably couples a body 2901 to first and second arms (see, e.g., arm 2802 in FIG. 28 and body 2901 in FIG. 29). The pivoting mechanism 2810 includes a housing assembly 3001 defining an orifice 3002. The housing assembly 3001 is configured to be secured to the body 2901 (see, e.g., FIG. 29). A pivot pin 3101 extends through the orifice 3002 of the housing assembly 3001. The pivot pin 3101 is configured to secure the first arm or the second arm (see, e.g., arm 2802 in FIG. 28) to the body portion 2901. The first arm or the second arm pivot about the pivot pin 3101 when the first arm or the second arm pivot with respect to the body portion 2901. A torsion spring 3102 is arranged about the pivot pin 3101. The torsion spring 3102 is configured to bias the first arm or the second arm toward a central region (see, e.g., central region 1404 in FIG. 15) when the first arm or the second arm is pivoted away from the central region. The action of the biased arms allows adequate pressure to be applied to a user's head such that the sensors described herein can get through hair, keep the device snug on the user's head, and increases the strength of signal detection by the sensors described herein.

The housing assembly 3001 includes an extension arm 3003 configured to be connected with the first arm or the second arm. The extension arm 3003 is rotatably secured to the pivot pin 3101.

In an aspect of the present disclosure, the extension arm 3003 includes a first extension member 3004 rotatably secured to the pivot pin 3101 and a second extension member 3005 spaced apart from the first extension member 3004. The second extension member 3005 is rotatably secured to the pivot pin 3101.

In an aspect of the present disclosure, the torsion spring 3102 includes an arm 3103 extending therefrom. The arm 3103 of the torsion spring 3102 is configured to contact the extension arm 3003 of the housing assembly 3001. The arm 3103 of the torsion spring 3102 is configured to bias the extension arm 3003 toward the central region.

The extension arm 3003 includes two flexible protrusions 3006, 3007 configured to mate with a corresponding track (see, e.g., track 2820 in FIG. 28) in the first or second arm (e.g., arm 2802 in FIG. 28). The pivoting protrusions 3006, 3007 allow longitudinal adjustment of the first or second arm with respect to the body 2901 to accommodate users having heads of varying sizes.

In an aspect of the present disclosure, the extension arm 3003 includes a recess 3201. The recess 3201 is configured to receive the arm 3103 of the torsion spring 3102.

Figure 35:
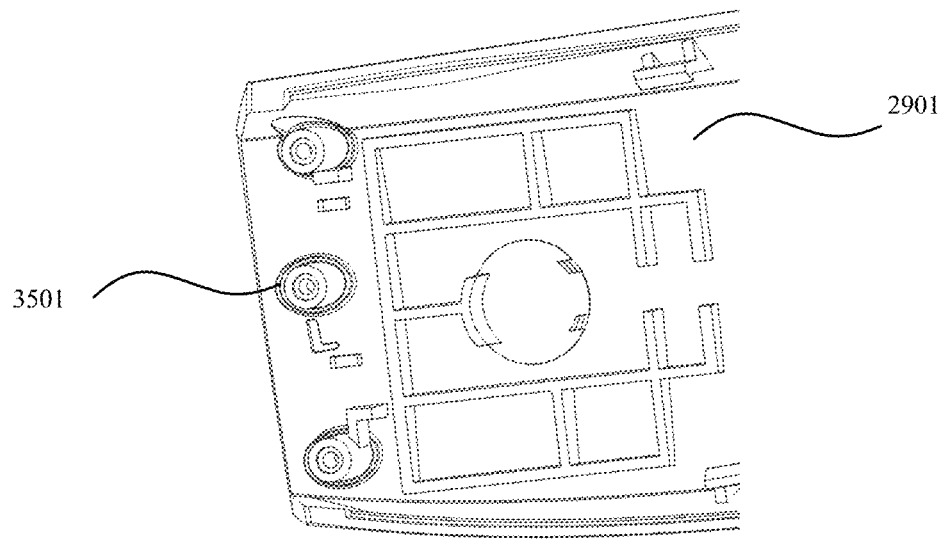
FIG. 35 is an internal view of the body portion of FIG. 29 illustrating an attachment assembly for the pivoting mechanism of FIG. 29.
Figure 36:
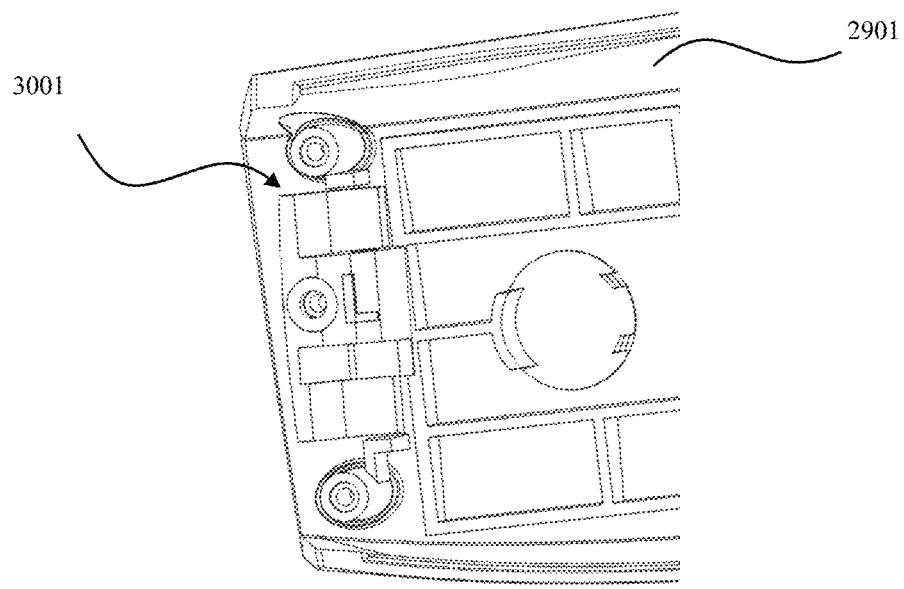
FIG. 36 is an internal view of the body portion of FIG. 29 illustrating the pivoting mechanism of FIG. 29 secured to the attachment assembly.

Referring particularly to FIGS. 35-36, the body 2901 may include an attachment post 3501 configured to secure the pivoting mechanism 2810 to the body 2901.

Figure 37:
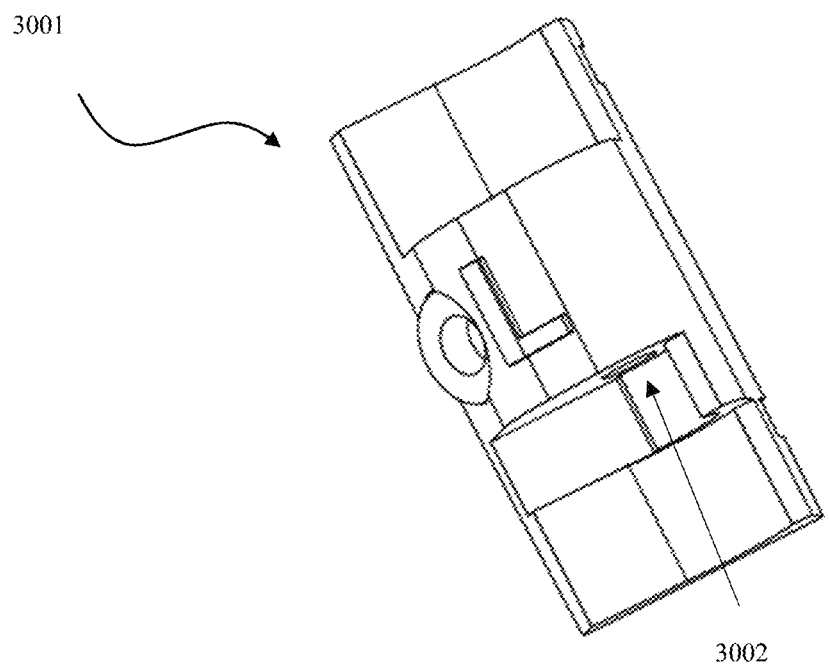
FIG. 37 is a perspective view of the pivoting mechanism of FIG. 29 with the pivot pin omitted.
Figure 38:
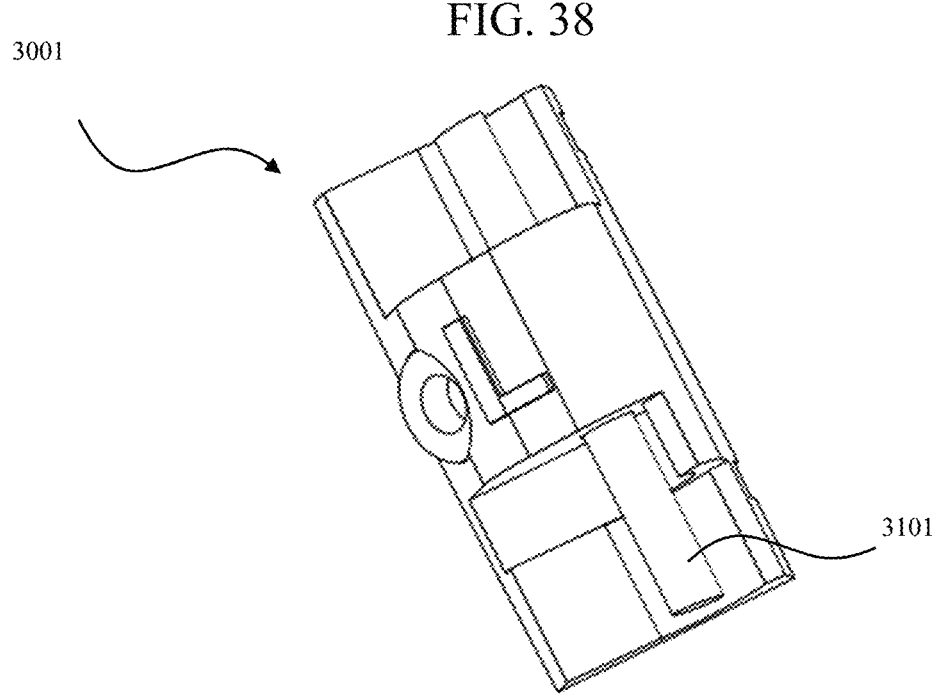
FIG. 38 is a perspective view of the pivoting mechanism of FIG. 29 with the pivot pin extending through an orifice of a housing assembly of the pivoting mechanism.

FIG. 37 illustrates the housing assembly 3001 with the pivot pin 3101 omitted. FIG. 38 illustrates the housing assembly 3001 with the pivot pin 3101 extending through the orifice 3002 of the housing assembly 3001 of the pivoting mechanism 2810.

It should be understood that the foregoing description is only illustrative of the present disclosure. Various alternatives and modifications can be devised by those skilled in the art without departing from the disclosure. Accordingly, the present disclosure is intended to embrace all such alternatives, modifications, and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A headware for computer control, the headware comprising:
   a body portion;
   a first arm pivotably coupled to the body portion;
   a second arm pivotably coupled to the body portion, the first arm and the second arm defining a central region therebetween; and
   a pivoting mechanism coupled to the first arm or the second arm and the body portion, the pivoting mechanism configured to pivot the first arm or the second arm towards or away from the central region between the first arm and the second arm, the pivoting mechanism including:
   a pivot pin securing the first arm or the second arm to the body portion, wherein the first arm or the second arm pivot about the pivot pin when the first arm or the second arm pivot with respect to the body portion; and
   a biasing member secured in the body portion, the biasing member configured to bias the first arm or the second arm toward the central region when the first arm or the second arm is pivoted away from the central region,
   wherein the biasing member is a torsion spring arranged about the pivot pin and includes an arm extending from the body portion toward the first arm or the second arm, the arm of the torsion spring configured to bias the first arm or the second arm towards the central region when the first arm or the second arm is pivoted away from the central region.

2. The headware according to claim 1, further including a recess formed in the first arm or the second arm, the recess configured to receive the arm of the torsion spring.

3. The headware according to claim 1, further including a biasing member cover removably coupled to the body portion and configured to cover the biasing member in the body portion.

4. The headware according to claim 3, wherein the biasing member cover includes a pivot pin cap.

5. The headware according to claim 2, wherein the biasing member cover includes at least one orifice aligned with an orifice formed in an interior of the body portion, the at least one orifice configured to receive a screw to secure the biasing member cover to the body portion.

6. The headware according to claim 1, further including at least one post extending from an inner surface of the body, the post configured to secure the biasing member to the body portion.

7. A headware for computer control, the headware comprising:
- an inner shell including an inner surface and an outer surface;
- an outer shell coupled to the inner shell, the outer shell defining an inner surface of the outer shell, and the inner shell and the outer shell defining an inner space between the inner shell and the outer shell; and
- at least one receiving point formed in the inner shell;
- at least one sensor movably coupled to the at least one receiving point, the at least one sensor including a plurality of electrode tips, the at least one sensor configured to measure electrical signals from a brain and communicate the electrical signals to a computing device,
- wherein the headware is configured to be secured to a user's head and apply pressure to at least one side of the head such that the electrode tips remain in direct contact with the user's head,
- wherein the at least one receiving point includes:
- an orifice formed in the inner layer, wherein electrode tips of the at least one sensor extend through the orifice;
- an electrode holder receptor extending from the inner surface of the inner layer into the inner space between the inner layer and the outer layer;
- an electrode holder movably positioned in the electrode holder receptor, wherein the at least one sensor is secured to the electrode holder;
- a flexible circuit including at least one electrical contact, wherein the at least one sensor is electro-mechanically connected with the at least one electrical contact; and
- a deformable block positioned on the inner surface of the outer shell, wherein the deformable block allows the electrode holder and the at least one sensor to move with respect to the inner shell to maintain contact between the electrode tips of the at least one sensor and the user's head, and wherein the deformable block allows the at least one sensor to remain continuously electro-mechanically connected with the at least one electrical contact.

8. The headware according to claim 7, further including a stiffening pad disposed between the at least one electrical contact and the deformable block, wherein the stiffening pad prevents warping or deformation of the flexible circuit.

9. The headware according to claim 8, further including a shelf formed on the inner surface of the outer shell, the shelf configured to support a bottom surface of the deformable block.

10. The headware according to claim 7, wherein the electrode holder includes a plurality of projections extending circumferentially outward from the electrode holder, wherein the electrode holder receiver defines a plurality of notches into which projections of the plurality of projections are respectively disposed, and wherein the plurality of notches allow the electrode holder and the at least one sensor secured thereto to tilt with respect to the inner shell.

11. The headware according to claim 7, wherein the electrode holder includes three projections and the electrode holder receptor includes three notches.

12. The headware according to claim 11, wherein the three notches are equally circumferentially spaced apart from each other about the electrode holder receptor.

* * * * *